United States Patent [19]

Abe et al.

[11] 4,265,287

[45] May 5, 1981

[54] PNEUMATIC TIRE HAVING ANTI-TRANSVERSE SKID PROPERTY FOR VEHICLES WHICH RUN AT HIGH SPEED UNDER HEAVY LOAD

[75] Inventors: Masaru Abe, Sayama; Yoshihiro Sakai, Kawasaki, both of Japan

[73] Assignee: Bridgestone Tire Co., Ltd., Tokyo, Japan

[21] Appl. No.: 69,406

[22] Filed: Aug. 24, 1979

[30] Foreign Application Priority Data

Aug. 24, 1978 [JP] Japan .............................. 53-102995

[51] Int. Cl.$^3$ .......................................... B60C 11/04
[52] U.S. Cl. ............................ 152/209 R; 152/209 B
[58] Field of Search ............ 152/209 R, 209 D, 209 B

[56] References Cited

U.S. PATENT DOCUMENTS

| | | | |
|---|---|---|---|
| 3,024,825 | 3/1962 | Kutsmichel | 152/209 R |
| 3,176,748 | 4/1965 | Giebhart | 152/209 R |
| 3,508,594 | 8/1966 | French | 152/209 R |
| 3,782,438 | 1/1974 | Mirtain | 152/209 R |

FOREIGN PATENT DOCUMENTS 443862  3/1936  United Kingdom ................ 152/209 R Primary Examiner—Michael W. Ball
Attorney, Agent, or Firm—Sughrue, Rothwell, Mion, Zinn and Macpeak

[57] ABSTRACT

A pneumatic tire having anti-transverse skid property for vehicles which run at a high speed under a heavy load comprising a depression provided in the tire sidewall near the shoulder and for circumferentially dividing the tire sidewall near the shoulder into a number of lands and a shoulder side groove provided in the land, the edge lines formed between the wall of the depression and shoulder side groove and the tire sidewall outer surface being designed so that the anti-transverse skid property of the tire is improved.

12 Claims, 40 Drawing Figures

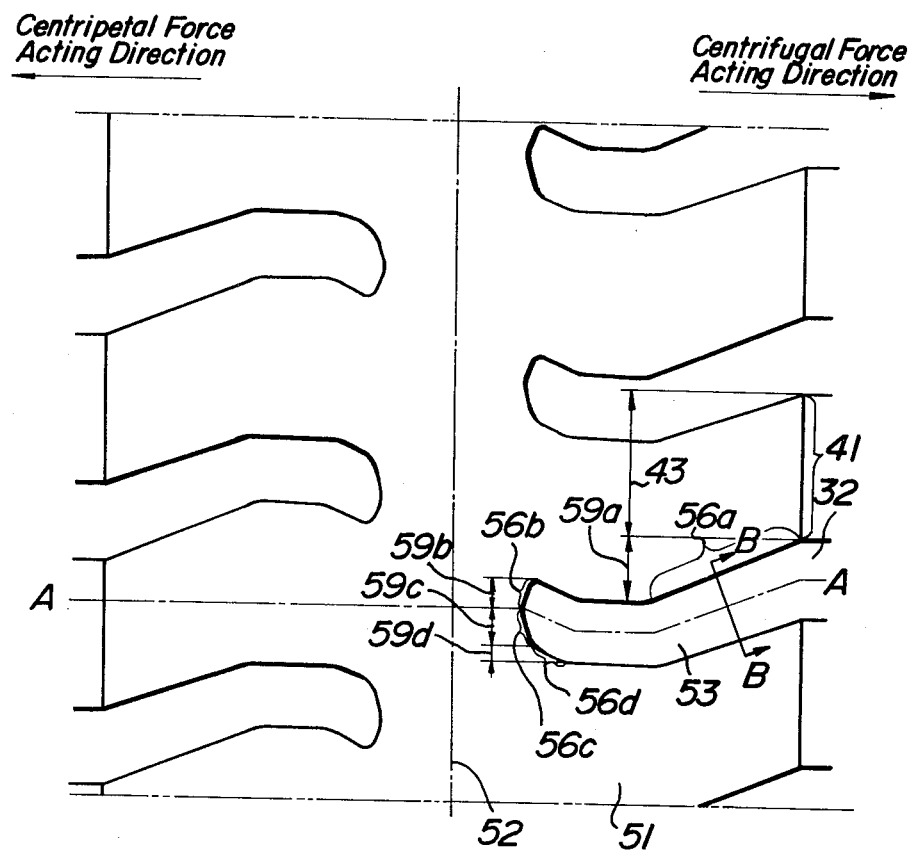
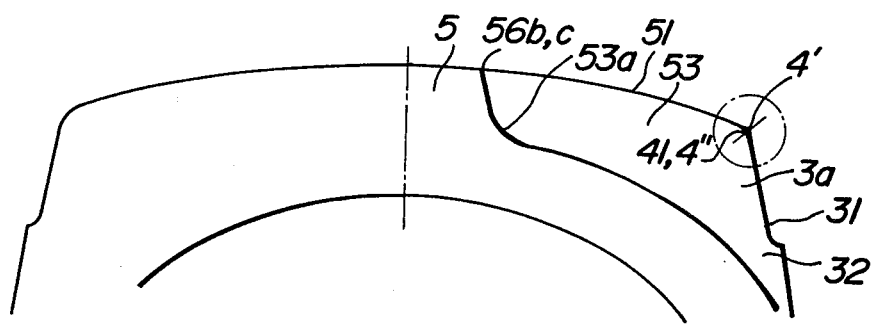
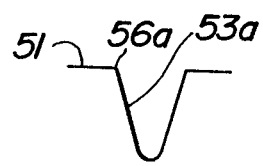
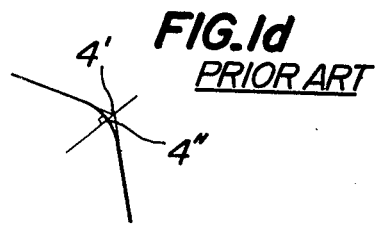

When Tire Runs along Straight Line Course

When Tire Runs along Curved Course

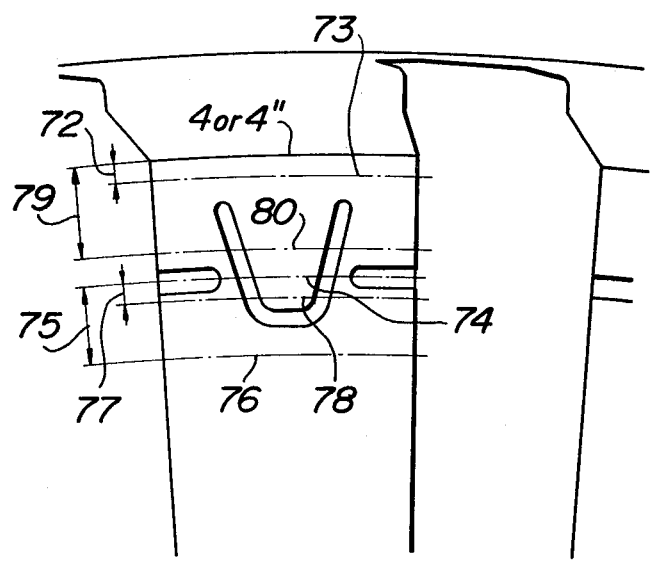
FIG._12
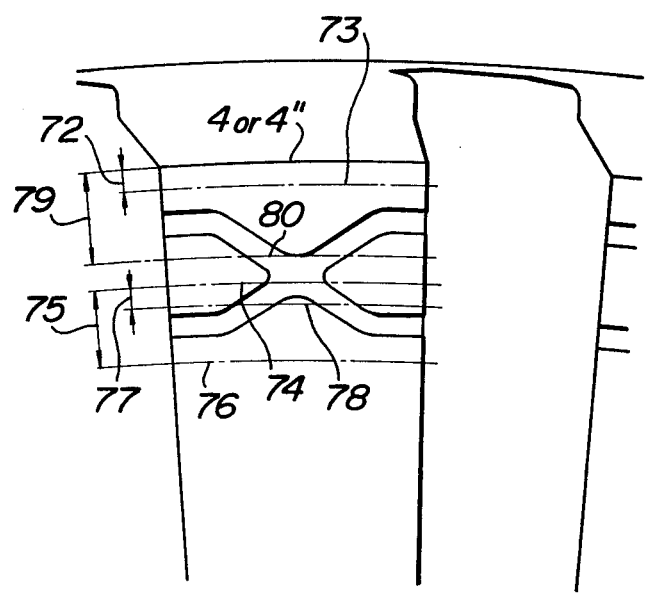
FIG._13

PNEUMATIC TIRE HAVING ANTI-TRANSVERSE SKID PROPERTY FOR VEHICLES WHICH RUN AT HIGH SPEED UNDER HEAVY LOAD

This invention relates to pneumatic tires and more particularly to a pneumatic tire having anti-transverse skid property for vehicles which run at a high speed under a heavy load and represented by trucks, buses, trailers (inclusive of those of small type) or the like.

The above mentioned kind of pneumatic tire must have excellent durability as represented by resistance to wear, separation resistant property, burst resistant property or the like, excellent maneuverability as represented by anti-skid property, maneuverable stability, rolling resistance or the like and also excellent low noise properties.

In the following, the term "skid" shall be understood to mean a condition under which the ground contact surface of the tire as a whole slips on the ground surface when the tire is braked or runs along a circular course and which excludes the local slip in the ground contact surface always produced when the tire is rotated and steered.

Recently, an increase of the maneuverable stability and antiskid property and particularly an increase of the antiskid property of tires for the purpose of improving the safety property and an increase of the low noise property for the purpose of improving the environment are urgently in demand. In prior art techniques, the improvement in the low noise property is contradictory to the improvement or maintenance in the durability and the improvement in the antiskid property is also contradictory to the improvement in the low noise property.

In order to improve the low noise property and also improve the anti-transverse skid property which is important in view of the safety operation, it is fundamentally preferable to use a tire having a rib pattern. But, if the tire having the rib pattern is used under severe conditions, there frequently induces failures inherent to the rib pattern such as a rib tear, groove crack, groove bottom cut due to stones cutting into the groove, separation failure due to burst and overheat of the shoulder portion or the like, thereby forcedly degrading the durability of the rib pattern tire.

In general, such degradation of the durability of the rib pattern tire becomes more conspicuous as the antiskid property is improved. This occurs because, in prior art techniques, in order to improve the antiskid property, the number of grooves or narrow grooves in the crown portion must be increased and in general these grooves or narrow grooves are required to be complex in configuration. In addition, the larger the number of grooves the stronger the noise. In addition, the noise becomes stronger as the groove configuration becomes complex.

As a result, if the number of grooves or narrow grooves is increased and the configuration thereof is made complex for the purpose of improving the antiskid property, it is inevitable that the noise increases and in addition the wear resistant property degrades.

On the one hand, a lug pattern can be used under severe conditions without involving any problem with respect to durability and hence has widely been used. But, the lug pattern is inferior in its antiskid property and low in noise property when compared to the rib pattern. In the lug pattern, if one of these two inferior properties is improved, the other inferior property becomes more conspicuous. Because, in order to improve the low noise property, in general, the number of the grooves in the crown portion of the tire must be decreased and the configuration of the groove must be simplified. As above described, the use of such measures exerts an adverse effect to the improvement in the antiskid property. Conversely, in prior art techniques, in order to improve the antiskid property, the number of grooves or narrow grooves must be increased and the configuration thereof must be complex. Similarly, in order to improve the low noise property, the number of the grooves or narrow grooves in the crown portion must be decreased and the configuration of the grooves must be simplified, thereby forcedly degrading the durability of the tire.

In prior art techniques, provision of a tire having an excellent durability, maneuverability and low noise property has been deemed an extremely difficult task. Defining an acceptable tire is an important problem for present tire design engineers.

Numerous experimental tests have demonstrated that the most important problem of providing the above mentioned tire can be solved by finding a method of improving the antiskid property and particularly anti-transverse skid property without increasing the number of the grooves or narrow grooves in the crown portion of the tire and without making the configuration of these grooves complex. If such method can be found, then it is possible to solve all the problems in a chain-like manner.

An object of the invention, therefore, is to provide a pneumatic tire having anti-transverse skid property for vehicles which run at a high speed under a heavy load, which can improve the anti-transverse skid property without degrading durability and low noise property thereof and which can improve the low noise property or durability without degrading the anti-transverse skid property of the tire.

A feature of the invention is the provision in a pneumatic tire having an anti-transverse skid property for vehicles which run at a high speed under heavy kload, comprising a pair of bead portions, a toroidal-shaped carcass extending across said bead portions, a tread rubber superimposed about said carcass, a tire sidewall connected through two side ends of said tread rubber, that is, shoulders to said tread, and a depression provided in said tire sidewall and for circumferentially dividing said sidewall into a number of lands. The improvement comprises a shoulder side groove provided in the land of the tire sidewall and improving the anti-transverse skid property of the tire and in which said shoulder side groove has a sectional configuration such that its depth is 0.0070 to 0.0255 times the tire sectional height and that the groove wall near the shoulder is inclined at an angle of 75° to 120° with respect to the tire sidewall outer surface. The shoulder side groove has such an arrangement that the total sum of those lengths of a crossing line between the groove wall near the shoulder and the tire sidewall outer surface, that is, an edge line of the shoulder side groove which are projected onto a plane perpendicular to both the radial plane containing the rotational axis of the tire and the tire equatorial plane for dividing said land into two portions is made larger than the total sum of those lengths of said edge line which are projected onto the radial plane containing the rotational axis of the tire. The shoulder side groove is located at a position spaced from said shoulder toward the bead portion along the tire sidewall outer surface by a distance which is at least 0.0123 times the tire sectional height, that portion of said groove edge line which is the nearest to the bead portion is located within a limited range which is distant apart from a crossing point between an arc having a radius of curvature which has a center on a tire width center line in the radial plane containing the rotational axis of the tire and which is 1.55 times larger than the tire maximum sectional width and passing the groove base at a crown portion groove depth measuring position and the tire sidewall outer surface by a distance along the tire sidewall outer surface which is 0.0123 to 0.0483 times the tire sectional height. The anti-transverse skid property of the tire at its wear end is improved, and those portions of said groove edge lines which are located between a position apart from said shoulder toward said bead portion along the tire sidewall outer surface by a distance which is 0.80 times the crown portion groove depth and said limited range and which are the nearest to the bead portion are arranged such that the total sum of those lengths of said groove edge lines which are projected onto a plane perpendicular to both the radial plane containing the rotational axis of the tire. The tire equatorial plane is at least 1.1 times larger than the total sum of those lengths of said groove edge lines which are projected onto said radial plane containing the rotational axis of the tire whereby the anti-transverse skid property of the tire after the middle wear period is improved.

Further objects and features of the invention will be fully understood from the following detailed description with reference to the accompanying drawings, in which:

FIG. 1a is a plan view of a conventional crown portion of a lug pattern tire;

FIG. 1b is a section on line A—A of FIG. 1a;

FIG. 1c is a section on line B—B of FIG. 1a;

FIG. 1d is an enlarged cross-sectional view of that portion of the shoulder portion of FIG. 1b which is shown by a dot-dash line circle in FIG. 1b;

FIG. 2b is a section on line A—A of FIG. 2a;

FIG. 4b is a section on line B—B of FIG. 4a;

FIG. 4c is a section on line C—C of FIG. 4a;

FIG. 5b is a section on line C—C of FIG. 5a;

FIGS. 8 to 22 are side elevational views of various modified embodiments of a tire according to the present invention;

Figure 2A:
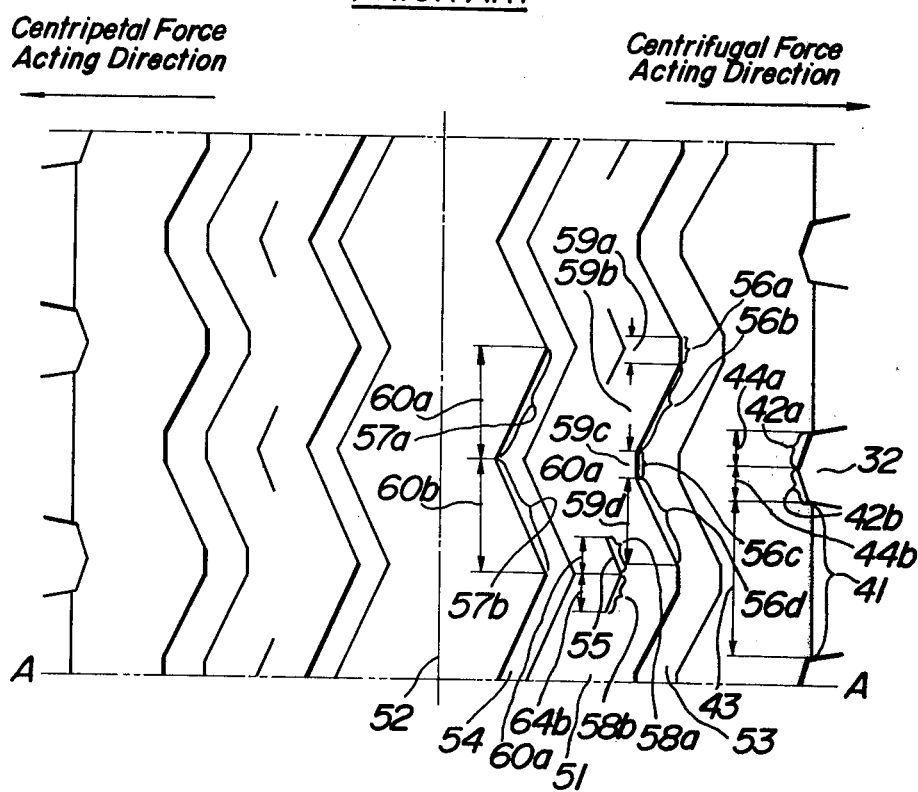
FIG. 2a is a plan view of a conventional crown portion of a rib pattern tire.

Preferred embodiments of a pneumatic tire constructed as above described according to the invention are efficiently obtained by the following limitations.

(1) The depression is located between a tire sidewall outer surface point spaced apart from the shoulder in the radial plane containing the rotational axis of the tire toward the bead portion along the tire sidewall outer surface by a distance which is 0.0186 times the tire sectional height and a tire sidewall outer surface point spaced apart from a crossing point between an arc having a radius of curvature which has a center on a tire width center line in the radial plane containing the rotational axis of the tire and which is 1.55 times larger than the tire maximum sectional width and passing through the groove base at a crown portion groove depth measuring position and the tire sidewall outer surface toward the bead portion along the tire sidewall outer surface by a distance which is 0.060 times the tire sectional height 1, has a width which is 0.42 to 1.25 times the land width measured at the same point in the same direction along substantially total region of the depression, and has a depth which is at least 1.5 times larger than the shoulder side groove depth measured at the same point as the shoulder side groove.

(2) A distance from a crossing point between that groove wall of the shoulder side groove which is near the bead portion in the radial plane containing the rotational axis of the tire and the tire sidewall outer surface to a crossing point between that groove wall of the other shoulder side groove adjacent to the bead portion which is near the shoulder and the tire sidewall outer surface is 0.0123 to 0.0372 times the tire sectional height.

(3) At least one portion of at least one end of the shoulder side groove having a total sum of those lengths of the groove edge line formed between said shoulder side groove wall and the tire sidewall outer surface which are projected onto a plane perpendicular to both the radial plane containing the rotational axis of the tire and the tire equatorial plane, the total sum being at least 0.5 times the total sum of the same projected lengths, communicates with the depression.

(4) The groove edge line formed between the groove wall of the shoulder side groove near the shoulder and the tire sidewall outer surface is distant apart from the shoulder in the radial plane containing the rotational axis of the tire toward the bead portion along the tire sidewall outer surface by a distance which is at least 0.0176 times the tire sectional height.

(5) That portion of the groove edge line of the shoulder side groove which is the nearest to the bead portion is located within a limited range spaced apart from a crossing point formed between an arc having a radius of curvature which has a center on a tire center line in the radial plane containing the rotational axis of the tire and which is 1.55 times larger than the tire maximum sectional width and passing through the groove base at a crown portion groove depth measuring position and the tire sidewall outer surface toward the bead portion along the tire sidewall outer surface by a distance which is 0.0176 to 0.372 times the tire sectional height.

(6) The total sum of those lengths of the groove edge line of the shoulder side groove which are projected to a plane perpendicular to both the radial plane containing the rotational axis of the tire and the tire equatorial plane is at least 1.5 times larger than the total sum of those lengths of said groove edge line which are projected to the radial plane containing the rotational axis of the tire.

(7) The total sum of these portions of the groove edge line of the shoulder side groove which are located at a position which lies between a position distant apart from the shoulder in the radial plane containing the rotational axis of the tire toward the bead portion along the tire sidewall outer surface by a distance which is 0.80 times a crown portion groove depth and a position nearest to the bead portion within said limited range and which are projected onto a plane perpendicular to both the radial plane containing the rotational axis of the tire and the tire equatorial plane is at least 1.5 times larger than the total sum of those portions of said groove edge line which are projected to the radial plane containing the rotational axis of the tire.

(8) The shoulder side groove has a depth which is 0.0088 to 0.0155 times the tire sectional height.

(9) The depression has a width which is measured in the circumferential direction and which is 0.48 to 0.95 times the land width which is measured at the same point and in the same direction along substantially total region of the depression.

(10) The depression has a depth which is at least 2.0 times larger than the depth of the shoulder side groove at the same position as said groove for improving the anti-transverse skid property.

(11) The total sum of those lengths of the edge line formed between the depression wall and the tire sidewall outer surface which are projected onto the radial plane containing the rotational axis of the tire and for dividing the depression into two halves is at least 3.3 times larger than the total sum of those lengths of said edge lines which are projected onto a plane perpendicular to both the radial plane containing the rotational axis of the tire and the tire equatorial plane.

(12) The distance from a crossing point between the groove wall near the bead portion of the shoulder side groove in the radial plane containing the rotational axis of the tire and the tire sidewall outer surface to a crossing point between the groove wall near the shoulder of the other shoulder side groove adjacent to the bead portion and the tire sidewall outer surface is 0.0176 to 0.0290 times the tire sectional height.

(13) The total sum of those lengths of the groove edge line formed between the groove wall near the shoulder of the shoulder side groove in the same land and the tire sidewall outer surface which are projected onto a plane perpendicular to both the radial plane containing the rotational axis of the tire and the tire equatorial plane is at least 0.5 times the circumferential average width of that portion of the land which is provided with said shoulder side groove.

(14) The total sum of those lengths of the above mentioned groove edge line of the shoulder side groove in the same land which are projected onto a plane perpendicular to both the radial plane containing the rotational axis of the tire and the tire equatorial plane is at least 1.0 times the circumferential average width of that portion of the land which is provided with said shoulder side groove.

(15) The groove wall near the shoulder in the cross sectional plane of the shoulder side wall is inclined at an angle of 85° to 110° with respect to the tire sidewall outer surface.

(16) The total sum of those lengths of each groove edge line formed between the groove wall near the shoulder of the shoulder side groove and the tire sidewall outer surface which are projected onto a plane perpendicular to both the radial plane containing the rotational axis of the tire and the tire equatorial plane for dividing the land is at least larger than the total sum of those lengths of said each groove edge line which are projected onto the radial plane containing the rotational axis of the tire.

(17) The total sum of those lengths of each groove edge line of the shoulder side groove which are projected onto a plane perpendicular to both the radial plane containing the rotational axis of the tire and the tire equatorial plane is at least 1.5 times larger than the total sum of those lengths of each of said groove edge line projected onto the radial plane containing the rotational axis of the tire.

(18) At least one half of all the lands are provided with the shoulder side grooves.

(19) All the lands are provided with the shoulder side groove.

(20) That portion of the above mentioned groove edge line in at least one half of the same land provided with the shoulder side groove which is the nearest to the bead portion is located within a limited range spaced apart from a crossing point between an arc having a radius of curvature which has a center on a tire width center line in the radial plane containing the rotational axis of the tire and which is 1.55 times larger than the tire maximum sectional width and passing through the groove base at a crown portion groove depth measuring position and the tire sidewall outer surface by a distance which is 0.0123 to 0.0483 times the tire sectional height toward the bead portion along the sidewall outer surface.

(21) That portion of said groove edge lines in all the same lands provided with the shoulder side grooves which is the nearest to the bead portion and located within a limited range distant apart from a crossing point formed between an arc having a radius of curvature which has a center on a tire width center line in the radial plane containing the rotational axis of the tire and which is 1.55 times larger than the tire maximum sectional width and the tire sidewall outer surface by a distance which is 0.0123 to 0.0483 times the tire sectional height toward the bead portion along the sidewall outer surface.

(22) The total sum of those lengths of the above mentioned groove edge lines in at least one half the same land provided with the shoulder side groove which are located between a position spaced apart from the shoulder on the radial plane containing the rotational axis of the tire by a distance which is 0.80 times the crown portion groove depth toward the bead portion along the tire sidewall outer surface and the limited range and which is the nearest to the bead portion and which are projected onto a plane perpendicular to both the radial plane containing the rotational axis of the tire and the tire equatorial plane is at least 1.5 times larger than the total sum of the groove edge lines projected onto the radial plane containing the rotational axis of the tire and is at least 0.5 times the circumferential average width of that portion of the land which is provided with the shoulder side groove.

(23) In those portions of the above mentioned groove edge line in all the same each provided with the shoulder side groove which are located between a position spaced apart from the shoulder in the radial plane containing the rotational axis of the tire by a distance which is 0.80 times the crown portion groove depth toward the bead portion along the tire sidewall outer surface and the above mentioned limited range, the total sum of those lengths of the groove edge line portions which are projected onto a plane perpendicular to both the radial plane containing the rotational axis of the tire and the tire equatorial plane is at least 1.5 times larger than the total sum of those lengths of the groove edge line which are projected onto the radial plane containing the rotational axis of the tire and is at least 0.67 times the circumferential average width of those portions of the land which are provided with the shoulder side grooves.

(24) The plane configuration of the shoulder side groove is symmetrical with respect to the center of the land.

(25) The tread surface pattern is monopitch and the above mentioned shoulder side walls are substantially the same in configuration and dimensions in all the lands provided with the shoulder side walls.

(26) The tread surface pattern is variable pitch and the above mentioned shoulder side grooves as a whole are similar in configuration and are substantially the same in the radial directions, dimensions and sectional dimensions.

(27) At least one portion of at least one end of the above mentioned shoulder side groove having a total sum of those lengths of the above mentioned groove edge line of the above mentioned shoulder side groove in the same land which are projected onto a plane perpendicular to both the radial plane containing the rotational axis of the tire and the tire equatorial plane and which are at least 0.67 times the total sum of the same projected lengths communicates with the above mentioned depression.

(28) At least one portion of at least one end of the shoulder side groove communicates with the above mentioned depression.

(29) At least one end of all the shoulder side grooves communicates with the above mentioned depression.

(30) Both ends of all the shoulder side grooves communicates with the above mentioned depression.

(31) The shoulder side groove has a width which is at least 0.0070 times the tire sectional height.

(32) The shoulder side groove has a width which is at least 0.0110 times the tire sectional height.

(33) One end only of the shoulder side groove communicates with the above mentioned depression and the width of the shoulder side groove is substantially the same or substantially enlarged from the other end of the shoulder side groove remaining in the land toward the end communicating with the above mentioned depression.

(34) Both ends of the shoulder side groove communicate with the above mentioned depressions and the width of the shoulder side groove is substantially the same or substantially enlarged from a position near the center of the shoulder side groove toward the both ends thereof.

(35) One end only of the shoulder side groove communicates with the above mentioned depression and the depth of the shoulder side groove is substantially the same or substantially enlarged from the other end remained in the land toward that end thereof which is in communication with the above mentioned depression.

(36) Both ends of the shoulder side groove are in communication with the above mentioned depression and the depth of the shoulder side groove is substantially the same or substantially enlarged from the center of the shoulder side groove toward the both ends thereof.

(37) The land provided with the shoulder side groove is also provided with an additional radially extending groove which substantially crosses the above mentioned shoulder side groove or connect the above mentioned shoulder side grooves with each other or is connected to the above mentioned shoulder side groove.

(38) The total sum of those lengths of the above mentioned groove edge lines of the shoulder side groove which are projected onto a plane perpendicular to both the radial plane containing the rotational axis of the tire and the tire equatorial plane is at most 7.0 times the total sum of those lengths of the same groove edge lines which are projected onto the radial plane containing the rotational axial of the tire.

(39) The total sum of those lengths of the above mentioned groove edge lines of the shoulder side groove which are projected onto a plane perpendicular to both the radial plane containing the rotational axis of the tire and the tire equatorial plane is 1.5 to 4.0 times larger than the total sum of those lengths of the same groove edge lines which are projected onto the radial plane containing the rotational axis of the tire.

(40) The total sum of those lengths of each of the above mentioned edge lines of the shoulder side groove which are projected onto a plane perpendicular to both the radial plane containing the rotational axis of the tire and the tire equatorial plane is at most 7.0 times the total sum of those lengths of each of the same edge lines which are projected onto the radial plane containing the rotational axis of the tire.

(41) The total sum of those lengths of each of the above mentioned groove edge line of the shoulder side groove which are projected onto a plane perpendicular to both the radial plane containing the rotational axis of the tire and the tire equatorial plane is 1.5 to 4.0 times larger than the total sum of those lengths of each of the same groove edge lines which are projected onto the radial plane containing the rotational axis of the tire.

(42) The configuration of the groove base of the shoulder side groove is flask-shaped or the like in section.

(43) That portion of the shoulder side groove which is relatively large in its circumferential component has a groove depth which is shallower than that of that part of the shoulder side groove which is relatively small in its circumferential component.

(44) One of the shoulder side grooves has one end in the land.

(45) One of the shoulder side grooves has two ends in the land.

(46) In one of the shoulder side grooves, the edge line formed between the groove wall near the bead portion and the tire sidewall outer surface is mainly composed of a combination of straight lines and these straight lines are connected with each other through an arc having a minimum radius which is at least 0.011 times the tire sectional height when an angle formed between the two straight lines is smaller than 180°.

(47) The edge line formed between the groove wall near the bead portion of the shoulder side groove and the tire sidewall outer surface is mainly composed of a combination of straight lines and these straight lines are connected with each other through an arc having a minimum radius which is at least 0.011 times the tire sectional height when an angle formed between the two straight lines is smaller than 180°.

(48) In one of the shoulder side grooves, the edge line formed between the groove wall near the bead portion and the tire sidewall outer surface is mainly composed of a combination of straight lines and all of those portions of these straight lines which are to be crossed with each other are connected through an arc having a minimum radius which is at least 0.0070 times the tire sectional height.

(49) The edge line formed between the groove wall near the bead portion of the shoulder side groove and the tire sidewall outer surface or its extension surface is mainly composed of a combination of straight lines and all of those portions of these straight lines which are to be crossed with each other are connected through an arc having a minimum radius which is at least 0.0070 times the tire sectional height.

(50) In one of the shoulder side grooves, the edge lines formed between all the groove walls and the tire sidewall outer surface are mainly composed of a combination of straight lines and those portions of these straight lines which form an angle facing the shoulder side groove and smaller than 180° are connected with each other through an arc having a minimum radius which is at least 0.011 times the tire sectional height.

(51) The edge lines formed between all the groove walls of the shoulder side groove and the tire sidewall outer surface are mainly composed of a combination of straight lines and those portions of these straight lines which form an angle facing the shoulder side groove and smaller than 180° are connected with each other through an arc having a minimum radius which is at least 0.011 times the tire sectional height.

(52) In one of the shoulder side grooves, the edge lines formed between all the groove walls of the shoulder side groove and the tire sidewall outer surface are mainly composed of a combination of straight lines and all those portions of these straight lines which cross with each other are connected with each other through an arc having a minimum radius which is at least 0.0070 times the tire sectional height.

(53) The edge lines formed between all the groove walls of the shoulder side groove and the tire sidewall outer surface are mainly composed of a combination of straight lines and all those portions of these straight lines which cross with each other are connected with each other through an arc having a minimum radius which is at least 0.0070 times the tire sectional height.

(54) In one of the groove wall of the shoulder side groove, the edge lines formed between all the groove walls of the shoulder side groove and the tire sidewall outer surface are composed of a combination of arcs having a minimum radius which is at least 0.0070 times the tire sectional height.

(55) The edge lines formed between all the groove walls of the shoulder side groove and the tire sidewall outer surface are composed of a combination of arcs having a minimum radius which is at least 0.0070 times the tire sectional height.

(56) That portion of the groove edge line formed between the groove wall near the shoulder of the shoulder side groove and the tire sidewall outer surface which is the nearest to the shoulder is located at a position spaced apart from the shoulder in the radial plane containing the rotational axis of the tire toward the bead along the tire sidewall outer surface by a distance which is 0.0483 times the tire sectional height.

(57) That portion of the above mentioned groove line of the shoulder side groove which is the nearest to the shoulder is located at a position which is spaced apart from the shoulder in the radial plane containing the rotational axis of the tire toward the bead portion along the tire sidewall outer surface by a distance which is 0.0335 times the tire sectional height.

(58) In at least one half the lands provided with the shoulder side groove, that portion of the groove edge lines formed between the groove wall of the above mentioned shoulder side groove in the same land and the tire sidewall outer surface which is the nearest to the shoulder are located at a position spaced apart from the shoulder in the radial plane containing the rotational axis of the tire toward the bead portion along the tire sidewall outer surface by a distance which is 0.0335 times the tire sectional height.

(59) In all the lands provided with the shoulder side grooves, that portion of the above mentioned groove edge line in the same land which is the nearest to the shoulder are located at a position which is spaced apart from the shoulder in the radial plane containing the rotational axis of the tire toward the bead portion by a distance which is at most 0.0335 times the tire sectional height.

(60) The number of the shoulder side grooves in the same radial plane containing the rotational axis of the tire is plural.

(61) The number of the shoulder side grooves in the same radial plane containing the rotational axis of the tire is 2 to 3.

(62) In at least one half of all the lands of the tire sidewall near the shoulder, provision is made of a shoulder side groove whose groove width is at least 0.0070 times the tire sectional height, whose groove depth is 0.0070 to 0.0225 times the tire sectional height and a plural number of grooves exist in the same radial plane containing the rotational axis of the tire, in at least one of the above mentioned shoulder side grooves, the groove edge lines formed between all the groove walls and the tire sidewall outer surface are mainly composed of straight lines, all those portions of these straight lines which cross with each other and which make an angle of at most 180° facing the groove side therebetween are connected through an arc having a minimum radius which is at least 0.011 times the tire sectional height and the remaining portions of these straight lines are connected through an arc having a minimum radius which is at least 0.0070 times the tire sectional height. In addition, in all the lands provided with the above mentioned shoulder side grooves, the total sum of those lengths of the groove edge lines formed between the groove walls near the shoulder of the above mentioned shoulder side grooves in the same land and the tire sidewall outer surface which are projected onto a plane perpendicular to both radial plane containing the rotational axis of the tire and the tire equatorial plane is at least 0.5 times the width of the land measured in the circumferential direction at the same position. The total sum of those lengths of each of the above mentioned groove edge lines of the above mentioned shoulder side wall which are projected onto a plane perpendicular to both the radial plane containing the rotational axis of the tire and the tire equatorial plane is at least larger than the total sum of those lengths of each of the same groove edge lines which are projected onto the radial plane containing the rotational axis of the tire. The total sum of those lengths of each of the same groove edge lines are projected onto a plane perpendicular to both the radial plane containing the rotational axis of the tire and the tire equatorial plane is 1.5 to 4.0 times the total sum of those lengths of each of the same groove edge lines which are projected onto the radial plane containing the rotational axis of the tire. In at least one half the lands provided with the above mentioned shoulder side grooves, that portion of the groove edge lines formed between the groove wall near the shoulder of the above mentioned shoulder side groove and the tire sidewall outer surface which is the nearest to the bead portion is located within a limited range distant apart from a crossing point between an arc having a radius of curvature which has a center on a tire width center line in the radial plane containing the rotational axis of the tire and which is 1.55 times the tire maximum sectional width and passing through the groove base at a crown portion groove depth measuring position and the tire sidewall outer surface toward the bead portion along the tire sidewall outer surface by a distance which is 0.0176 to 0.0372 times the tire sectional height. The total sum of those lengths of the groove edge lines formed between the groove walls near the shoulder of all the above mentioned shoulder side grooves and the tire sidewall outer surface which are located between a position spaced apart from the shoulder in the radial plane containing the rotational axis of the tire toward the bead portion along the tire sidewall outer surface by a distance which is 0.80 times the crown portion groove depth and that portion of the above mentioned limited range which is the nearest to the bead portion and which are projected onto a plane perpendicular to both the radial plane containing the rotational axis of the tire and the tire equatorial plane is 1.5 times larger than the total sum of those lengths of the above mentioned groove edge lines which are projected onto the radial plane containing the rotational axis of the tire. In at least one half the lands provided with the above mentioned shoulder side grooves, the total sum of those lengths of that portion of the above mentioned groove edge line in the same land which is located between a position distant apart from the shoulder in the radial plane containing the rotational axis of the tire toward the bead portion along the tire sidewall outer surface by a distance which is 0.80 times the crown portion groove depth and that portion of the above mentioned limited range which is the nearest to the bead portion which are projected onto a plane perpendicular to both the radial plane containing the rotational axis of the tire and the tire equatorial plane is 1.5 times larger than the total sum of those lengths of the above mentioned groove edge line portion which are projected onto the radial plane containing the rotational axis of the tire and at least 0.5 times the width of the land measured at the same position in the circumferential direction. In at least one half the land provided with the above mentioned shoulder side grooves, that portion of the above mentioned groove edge line in the same land which is the nearest to the shoulder is located at a position which is nearer to the shoulder than a position distant apart from the shoulder in the radial plane containing the rotational axis of the tire toward the bead portion along the tire sidewall outer surface by a distance which is 0.0355 times the tire sectional height. An angle formed between the shoulder side groove wall in the sectional plane of the above mentioned shoulder side groove and the tire sidewall outer surface is 85° to 110°. In all the lands provided with the above mentioned shoulder side grooves, at least one portion of at least one end of the above mentioned shoulder side groove in which, those lengths of the total sum of the above mentioned groove edge lines in the same land which are projected onto a plane perpendicular to both the radial plane containing the rotational axis of the tire and the tire equatorial plane is at least 0.67 times the total sum of the above mentioned groove edge lines, communicates with the above mentioned depression.

(63) First, all the lands in the tire sidewall near the shoulder are provided with shoulder side grooves having a groove width which is at least 0.0070 times the tire sectional height, a groove depth which is 0.0070 to 0.025 times the tire sectional height. Second, the groove edge lines formed between the groove wall near the shoulder of all the shoulder side grooves are located at a position which is spaced apart from the shoulder in the radial plane containing the rotational axis of the tire toward the bead portion along the tire sidewall outer surface by a distance which is at least 0.0176 times the tire sectional height and the number of grooves appeared in the same radial plane containing the rotational axis of the tire is 2 to 3. Third, the plane configuration of all the shoulder side grooves is substantially symmetrical with respect to the center of the land. Fourth, the edge lines formed between all the groove walls of the above mentioned shoulder side grooves and the tire sidewall outer surface are mainly composed a combination of straight lines and those portions of these straight lines which cross with each other and which have an angle smaller than 180° formed between these straight lines and facing the shoulder side groove are connected with each other through an arc having a minimum radius which is at least 0.011 times the tire sectional height and the remaining portions of the above mentioned straight lines are connected with each other through an arc having a minimum radius which is at least 0.0070 times the tire sectional height. Fifth, the total sum of those lengths of each of the above mentioned groove edge lines of all the above mentioned shoulder side grooves which are projected onto a plane perpendicular to both the rotational plane containing the rotational axis of the tire and the tire equatorial plane is 1.5 to 4.0 times larger than the total sum of those lengths of each of the above mentioned groove edge lines which are projected onto the radial plane containing the rotational axis of the tire. Sixth, that portion of the groove edge lines formed between the groove wall near the shoulder of the above mentioned shoulder side grooves in all the same lands and the tire sidewall outer surface which is the nearest to the bead portion is located within a limited range distant apart from a crossing point between an arc having a radius of curvature which has a center on a tire width center line in the radial plane containing the rotational axis of the tire and which is 1.55 times larger than the tire maximum sectional width and passing through the groove base at a crown portion groove depth measuring position and the tire sidewall outer surface toward the bead portion along the tire sidewall outer surface by a distance which is 0.0176 to 0.0372 times the tire sectional height. Seventh, the total sum of those lengths, of that portion of the above mentioned groove edge lines in all the same lands which is located between a position distant apart from the shoulder in the radial plane containing the rotational axis of the tire toward the bead portion along the tire sidewall outer surface by a distance which is 0.80 times the crown portion groove depth and that position in the above mentioned limited range which is the nearest to the bead portion, which are projected onto a plane perpendicular to both the radial plane containing the rotational axis of the tire and the tire equatorial plane is at least 1.5 times larger than the total sum of those lengths of the above mentioned groove edge line portions which are projected onto the radial plane containing the rotational axis of the tire and is at least 0.67 times the land width measured at the same position in the circumferential direction. Eighth, that portion of the above mentioned groove edge lines in all the same lands which is the nearest to the shoulder is located at a position which is nearer to the shoulder than a position which is distant apart from the shoulder in the radial plane containing the rotational axis of the tire toward the shoulder along the tire sidewall outer surface by a distance which is 0.0335 times the tire sectional height. Ninth, an angle formed between the shoulder side groove wall in the sectional plane of the above mentioned shoulder side groove and the tire sidewall outer surface is 85° to 110°. Tenth, the shoulder side grooves in all the lands are similar in overall configuration and substantially the same in radial and sectional dimensions. Eleventh, the width of the above mentioned depression measured in circumferential direction is 0.48 to 0.95 times the land width measured at the same point in the same direction along substantially total range of the depression and the depth of the above mentioned depression is at least 2.0 times larger than the groove depth of the above mentioned shoulder side groove. Twelfth, the total sum of those lengths of the edge line formed between the wall of the above mentioned depression and the tire sidewall outer surface which are projected onto the radial plane containing the rotational axis of the tire is at least 3.3 times larger than the total sum of those lengths of the above mentioned edge line which are projected onto a plane perpendicular to both the radial plane containing the rotational axis of the tire and the tire equatorial plane. Thirteenth, two ends of all the above mentioned shoulder side grooves having the total sum of those lengths of the above mentioned groove edge lines of all the above mentioned shoulder side grooves in all the same lands which are projected onto a plane perpendicular to both the radial plane containing the rotational axis of the tire and the tire equatorial plane and which are at least 0.5 times the total sum of those lengths of the same groove edge lines communicate with the above mentioned depression and the groove width and depth of the shoulder side groove extending from the center toward both ends thereof are substantially the same or enlarged. Fourteenth, the distance along the tire sidewall outer surface from a crossing point between the groove wall near the bead portion of all the above mentioned shoulder side grooves in the radial plane containing the rotational axis of the tire and the tire sidewall outer surface to a crossing point between the groove wall near the shoulder of the other shoulder side groove which is adjacent to the bead portion and the tire sidewall outer surface is 0.0176 to 0.0290 times the tire sectional height.

(64) First, all the lands in the tire sidewall near the shoulder are provided with the above mentioned shoulder side grooves having a groove width which is at least 0.0110 times the tire sectional height, a groove depth which is 0.0080 to 0.0155 times the tire sectional height and the number appearing in the same radial plane containing the rotational axis of the tire which is 2. Second, the edge line formed between all the groove walls of all the above mentioned shoulder side grooves and the tire sidewall outer surface are mainly composed of straight lines and those portions of these straight lines which cross with each other and which have an angle smaller than 180° formed between these straight lines and facing the shoulder side groove are connected with each other through an arc having a minimum radius which is at least 0.011 times the tire sectional height and the remaining portions of the above mentioned straight lines are connected with each other through an arc having a minimum radius which is at least 0.0070 times the tire sectional height. Third, the total sum of those lengths of each of the groove edge lines formed between the groove wall near the shoulder of the above mentioned shoulder side groove and the tire sidewall outer surface which are projected onto a plane perpendicular to both the radial plane containing the rotational axis of the tire and the tire equatorial plane is 1.5 to 4.0 times larger than the total sum of those lengths of each of the above mentioned groove edge lines which are projected onto the radial plane containing the rotational axis of the tire. The length of that portion of each edge line which is substantially parallel to a plane perpendicular to both the radial plane containing the rotational axis of the tire and the tire equatorial plane is at least 0.33 times the total sum of those lengths of the groove edge lines which are projected onto a plane perpendicular to both the radial plane containing the rotational axis of the tire and the tire equatorial plane. Fourth, that portion of the groove edge lines formed between the groove wall near the shoulder of the above mentioned shoulder side grooves in all the same lands and the tire sidewall outer surface which is the nearest to the bead portion is located within a limited range distant apart from a crossing point between an arc having a radius of curvature which has a center on a tire width center line in the radial plane containing the rotational axis of the tire and which is 1.55 times larger than the tire maximum width and passing through the groove base at a crown portion groove depth measuring position and the tire sidewall outer surface toward the bead portion along the tire sidewall outer surface by a distance which is 0.0176 to 0.0372 times the tire sectional height. Fifth, the total sum of those lengths, of that portion of all the above mentioned groove edge lines in all the same lands which is located between a position spaced apart from the shoulder in the radial plane containing the rotational axis of the tire toward the bead portion along the tire sidewall outer surface by a distance which is 0.80 times the crown portion groove depth and in that position in the above mentioned limited range which is the nearest to the bead portion, which are projected onto a plane perpendicular to both the radial plane containing the rotational axis of the tire and the tire equatorial plane is at least 1.5 times larger than the total sum of those lengths of the above mentioned groove edge portions which are projected onto the radial plane containing the rotational axis of the tire and is at least 0.67 times the land width measured at the same position in the circumferential direction. Sixth, that portion of the above mentioned groove edge lines in all the same lands which is the nearest to the shoulder is located at a position which is nearer to the shoulder than a position which is distant apart from the shoulder in the radial plane containing the rotational axis of the tire toward the shoulder along the tire sidewall outer surface by a distance which is 0.0335 times the tire sectional height. Seventh, an angle formed between the shoulder side groove wall in the sectional plane of the above mentioned shoulder side wall and the tire sidewall outer surface is 85° to 110°. Eighth, the shoulder side grooves in all the lands are similar in overall configurations and substantially the same in radial and sectional dimensions. Ninth, the width of the above mentioned depression measured in circumferential direction is 0.48 to 0.95 times the land width measured at the same point in the same direction along substantially total range of the depression and the depth of the above mentioned depression is at least 2.0 times larger than the groove depth of the above mentioned shoulder side groove. Tenth, the total sum of those lengths of the edge line formed between the wall of the above mentioned depression and the tire sidewall outer surface which are projected onto the radial plane containing the rotational axis of the tire is at least 3.3 times larger than the total sum of those lengths of the above mentioned edge line which are projected onto a plane perpendicular to both the radial plane containing the rotational axis of the tire and the tire equatorial plane. Eleventh, two ends of all the above mentioned shoulder side grooves communicate with the above mentioned depression and the groove width and depth of the shoulder side groove extending from the center toward both ends thereof are substantially the same or enlarged. Twelfth, the distance along the tire sidewall outer surface from a crossing point between the groove wall near the bead portion of all the above mentioned shoulder side grooves in the radial plane containing the rotational axis of the tire and the tire sidewall outer surface to a crossing point between the groove wall near the shoulder of the other shoulder side groove which is adjacent to the bead portion and the tire sidewall outer surface is 0.0176 to 0.0290 times the tire sectional height.

(65) In the above paragraph (64), the crown portion pattern is of a lug pattern.

(66) One end of all the shoulder side grooves is in communication with the above mentioned depression and the groove width and depth of the shoulder side groove extending from the end in the land toward that end thereof which is in communication with the above mentioned depression are substantially the same or enlarged, the other limitations being the same as those described in the above paragraph (64).

(67) In the above paragraph (66), the crown portion pattern is of a lug pattern.

(68) Both ends of one of the above mentioned shoulder side grooves in the same land communicate with the above mentioned depressions and the groove width and depth are substantially the same or enlarged from a position near the center of the shoulder side groove toward both ends thereof and one end of all the remaining shoulder side grooves communicate with the above mentioned depression and the groove width and depth are substantially the same or enlarged from that end of the shoulder side groove which is in the land toward that end thereof which is in communication with the above mentioned depression.

(69) In the above paragraph (68), the crown portion pattern is of a lug pattern.

The antiskid property is primarily divided into an anti-longitudinal skid property operative in a direction perpendicular to the rotary shaft of the tire and an anti-transverse skid property operative in the rotary shaft direction of the tire. The anti-transverse skid property is far more important than the anti-longitudinal skid property with respect to the safety property of the tire. This is because, the change of the anti-longitudinal skid property dependent on the level change of the design elements is smaller than that of the anti-transverse skid property. In addition, the longitudinal skid is substantially always produced everytime the brake is applied to the tire which runs on the wetted ground surface. It is possible to sensibly catch the anti-longitudinal skid property and hence adjust the time of applying the brake. More or less degradation of the anti-longitudinal skid property does not present a large problem with respect to the safety property of the tire.

On the contrary, the anti-transverse skid property involves a change dependent on the level change of the design elements, the change being large if compared with that of the anti-longitudinal skid property. In addition, if transverse skid occurs, maneuverability becomes impossible, and as a result, it is very likely that an accident arises. It is impossible to cause an accident during running of the tire for the purpose of sensibly catching the anti-transverse skid property of the tire. As a result, the speed and steering angle of the tire could not be adjusted in response to the anti-transverse skid. Thus, more or less degradation of the anti-transverse skid property becomes a large problem with respect to the safety property of the tire.

The present invention proceeds from an investigation on a mechanism for generating the transverse skid relating to the prior art tires and on a mode of the tires when a transverse skid occurs.

Detailed observations and investigations on the transverse skid of the conventional tires have demonstrated that the anti-transverse skid property, that is, resistance to the transverse slip, is largely dependent on the total sum of those lengths of the edge lines, formed between the tread surface present in the ground contact surface when the tire runs along the curved course and that groove wall of the groove and narrow groove which is located at the side to which the centripetal force acts and of the edge lines formed between the tread surface and that tire sidewall to which the centrifugal force acts, and projected onto the tire equatorial line. As total sum is increased the more the anti-transverse skid property is improved.

The above described limitations defined by the invention will now be described with reference to the drawings.

Figure 2B:
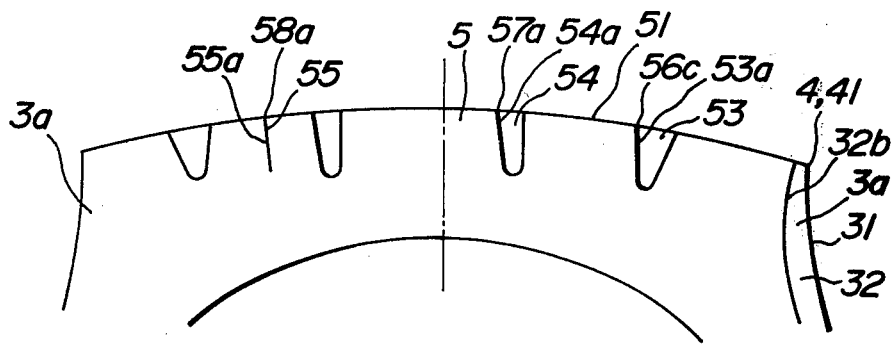

FIGS. 1a to 1d show a representative example of a conventional lug pattern tire. FIGS. 2a and 2b show a representative example of a conventional rib pattern tire. The anti-transverse skid property of the tire is largely dependent on the total sum of those lengths $59a$, $59b$, $59c$, $59d$, $43$ or $59a$, $59b$, $59c$, $59d$, $60a$, $60b$, $61a$, $61b$, $43$, $44a$, $44b$, of edge lines $56a$, $56b$, $56c$, $56d$ or $56a$, $56b$, $56c$, $56d$, $57a$, $57b$, $58a$, $58b$ formed between a tread surface $51$ present in the ground contact surface when a vehicle runs along a curved course and that groove wall $53a$ or $53a$, $54a$, $55a$ of a groove $53$ or $53$, $54$ to which is acted the centripetal force, an edge line $41$ formed between the tread surface $51$ and the tire sidewall outer surface $31$ located at the side to which is acted the centrifugal force, and edge lines $42a$, $42b$ formed between the tread surface $51$ and the groove base $32b$ of a depression $32$ provided in the tire sidewall $3a$ near the shoulder and located at the side to which is acted the centrifugal force, which are projected onto the tire equatorial line 52 and is increased when the total sum of these lengths is increased.

The reference numerals before the word "or" shall be understood to designate parts of the lug pattern shown in FIG. 1, while the reference numerals after the word "or" shall be understood to designate parts of the rib pattern shown in FIG. 2.

As well known in the art, transverse skid occurs when the centrifugal force subjected to the tire when the vehicle runs along the curved course exceeds a maximum limit value of the centripetal force generally called as the cornering force that tends to be produced between the tire and its ground contact surface. The maximum limit value of the centripetal force is determined by the load subjected to the tire and by the overall frictional coefficient between the tire and the ground surface. In general, the overall frictional coefficient between the tire and the ground surface is so large that transverse skid seldom occurs provided that the tire usually runs along the usual dry ground surface. A transverse skid occurs only under such limited conditions that the tire runs at a high speed along the curved wet ground surface particularly on which is produced a water film and which even under a dry condition has a small frictional coefficient.

The frictional mechanism between the thread rubber and the ground surface is very complex. The cause of the frictional mechanism has not yet been made clear. But, in general it is recognized that friction is caused by the following two phenomena. That is, (1) Adhesion produced when ionic coupling is induced between the rubber molecule and the ground surface molecule.

(2) Hysteresis loss produced when the rubber becomes deformed due to uneven ground surface.

Based on these recognitions, the reasons why the above mentioned transverse skid tends to be produced when the flat and smooth ground surface is wetted and the reasons why the anti-transverse skid property of the tire on such ground surface is largely dependent on the total sum of those lengths of edge lines, formed between a tread surface present on the ground contact surface of the tire and those groove wall of grooves and narrow grooves that are located at the side to which is acted the centripetal force and edge lines formed between the tread surface and that tire sidewall to which is acted the centrifugal force, which are projected onto the tire equatorial line and is increased as the total sum of those lengths is increased can be explained as follows.

If there is no substantial uneveness of the ground surface, less deformation of the rubber is produced. As a result, the hysteresis loss produced when the rubber is deformed becomes small. If the ground surface is wetted to produce the water film thereon, the presence of the water film functions to prevent the rubber from contacting with the ground surface. As a result, the hysteresis loss produced when the rubber is deformed becomes smaller and the ionic coupling between the rubber molecule and the road surface molecule becomes small. The tire is particularly easy to skid when it begins to rain because mud particles on the ground surface are mixed with water to produce a water film which has a high viscosity and hence which is difficult to be severed into pieces, thereby further preventing the rubber from contacting with the ground surface.

If the number of the grooves or narrow grooves is increased, water drainage is accelerated, while if the number of the edge lines is increased, the water film becomes easily severed. As a result, the rubber is easily brought into contact with the ground surface. But, not only the hysteresis loss produced when the rubber becomes deformed but also the ionic coupling between the rubber molecule and the ground surface molecule are increased. In addition, the increase of the number of the above mentioned edge lines results in a decrease of the rigidity of the tread in the direction in which acts the centrifugal force. As a result, the deformation of the rubber with respect to the above mentioned ground surface becomes increased, thereby further increasing the hysteresis loss.

As above mentioned, in order to improve the anti-transverse skid property, it is sufficient to increase the total sum of those lengths of the above mentioned edge lines which are projected onto the tire equatorial line. In prior art techniques, the grooves or narrow grooves in the crown portion 5 have been made large in number and complex in configuration for the purpose of making the total sum of lengths of those portions of the edge lines which are projected onto the tire equatorial line of the tire large. But, the use of such measures involves degradation of the low noise property and durability of the tire.

In the following, the term "crown portion 5" shall be understood to mean a region between two shoulders and the term shoulder shall be understood to mean a crossing point 4 between the tread surface and the tire sidewall as shown in FIG. 2b or a crossing point 4" between a vertical line drawn from a crossing point 4' between an extension line of the tread surface and an extension line of the tire sidewall to the tire surface on the one hand and the tire surface on the other hand as shown in FIG. 1d. The crown portion 5 between those shoulders is composed as usual of tread rubber.

Detailed observations on movements of a tire when transverse skid occurs have demonstrated that when the transverse skid occurs not only the crown portion but also the tire sidewall outer surface 31 near the shoulder 4 or 4" make contact with the ground surface.

Figure 3A:
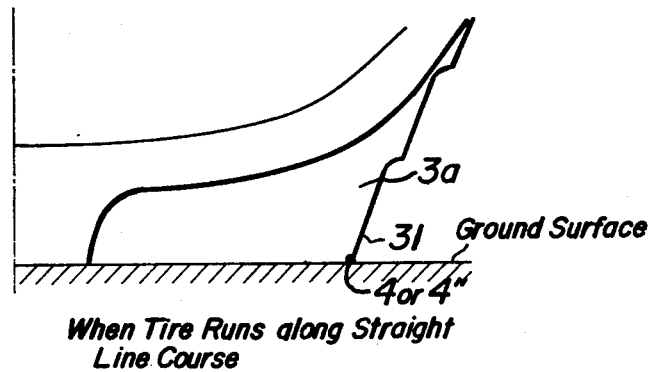
FIG. 3a is a cross-sectional view of a tire when it runs along a straight line course.

FIG. 3a shows that when the tire runs along a straight line course, the tire sidewall outer surface 31 near the ground surface does not make contact with the ground surface.

Figure 3B:
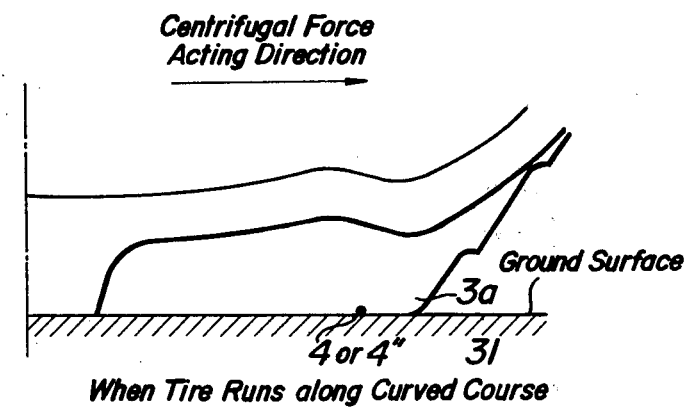
FIG. 3b is a cross-sectional view of a tire when it runs along a curved course.

FIG. 3b shows that when the tire runs along a curved course the tire sidewall outer surface 31 makes contact with the ground surface.

Based on the above mentioned facts, the inventors have made many experimental tests which have shown that if provision is made of the above mentioned groove edge line at an optimum position of the tire sidewall 3a near the shoulder, it is possible to obtain the effect which is the same as that of the above mentioned edge line located in the crown portion without exerting any adverse influence upon the low noise property and durability of the tire.

Based on such novel recognition, the inventors have made many experimental tests and considerations on the configurations of shoulder of the above mentioned kind of pneumatic tire in association with the above mentioned use of the tire for the purpose of attaining the above mentioned object of the invention. These experimental tests and investigations have shown that good results can be obtained if the following matters are fundamentally made clear and synthetically harmonized with each other.

A. Suppression of degradation of overall durability and low noise property.

B. Rationalization of rigidity of shoulder portion.

C. Improvement in water drainage property of the sidewall near the shoulder.

D. Suppression of local concentration of strain produced in the sidewall near the shoulder.

E. The anti-transverse skid property of the tire is made everlasting.

Figure 4A:
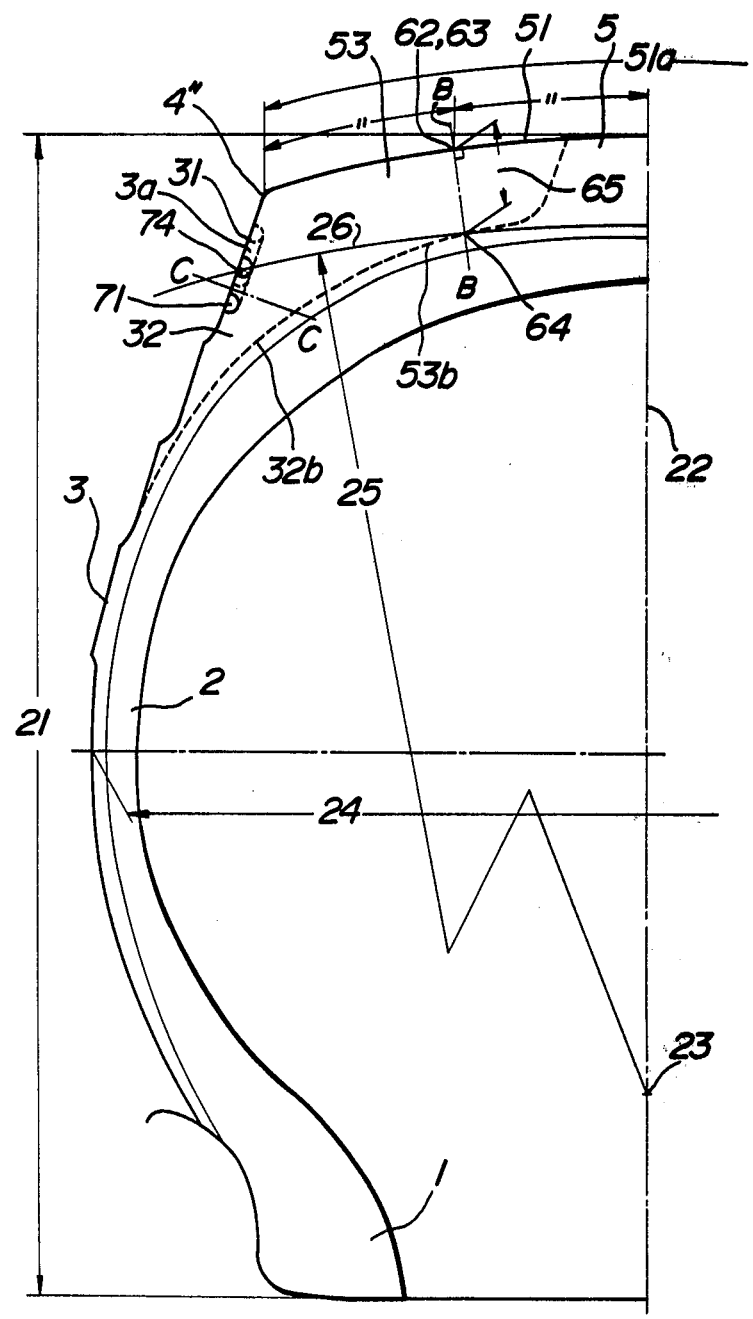
FIG. 4a is a cross-sectional view of one embodiment of a tire according to the present invention.
Figure 4B:
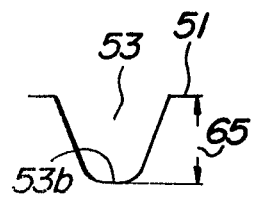
Figure 4C:
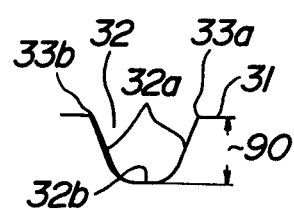
Figure 4D:
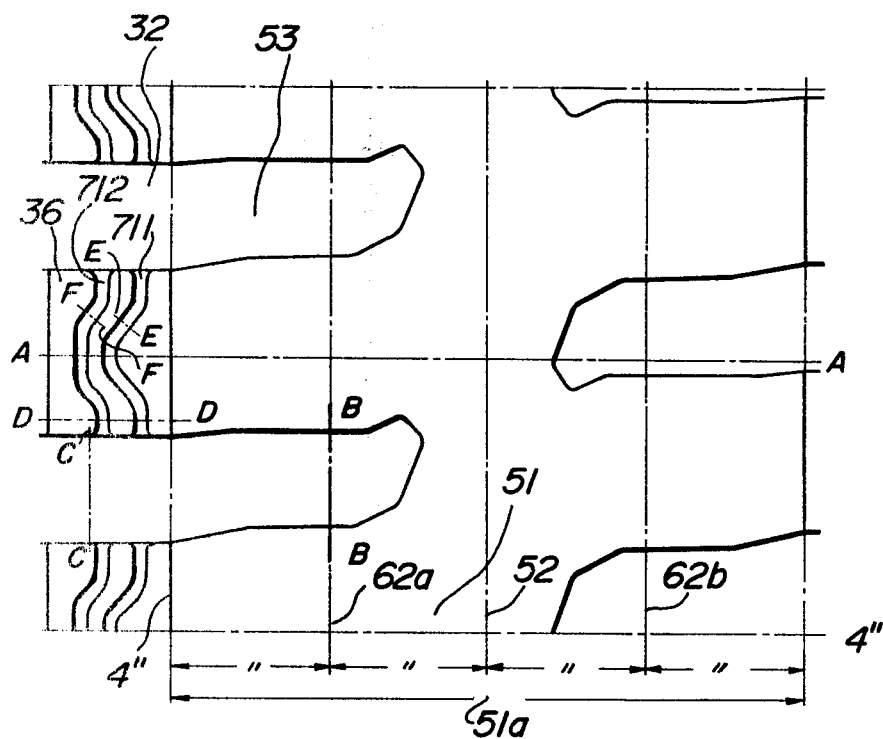
FIG. 4d is a development view of a crown portion and a sidewall near a shoulder.
Figure 4E:
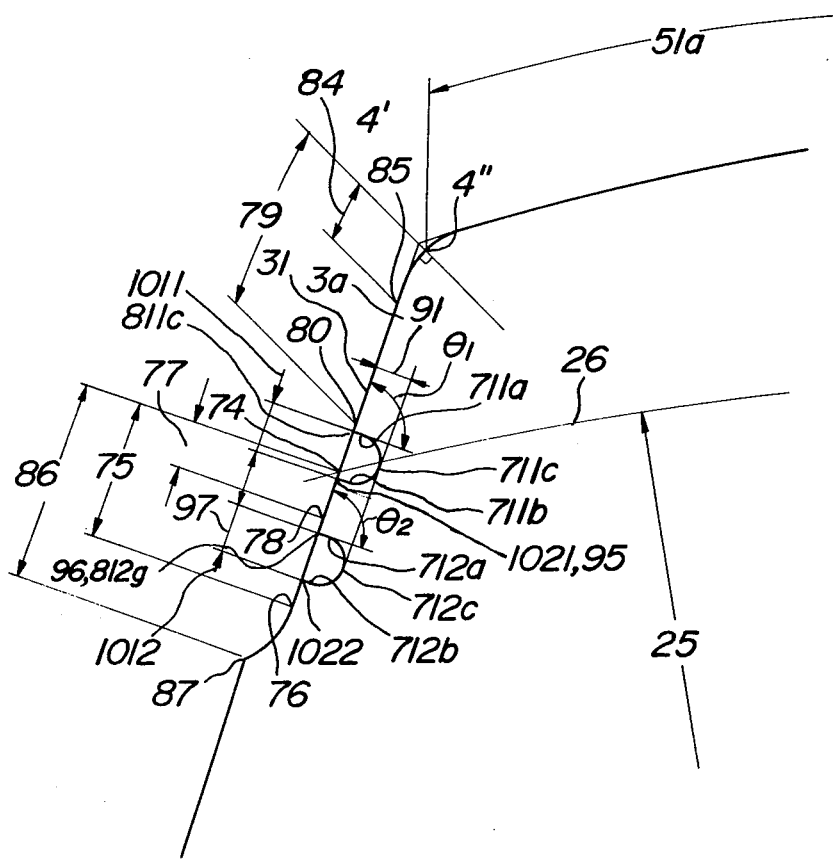
FIG. 4e is a sectional on line A—A of FIG. 4d.
Figure 4F:
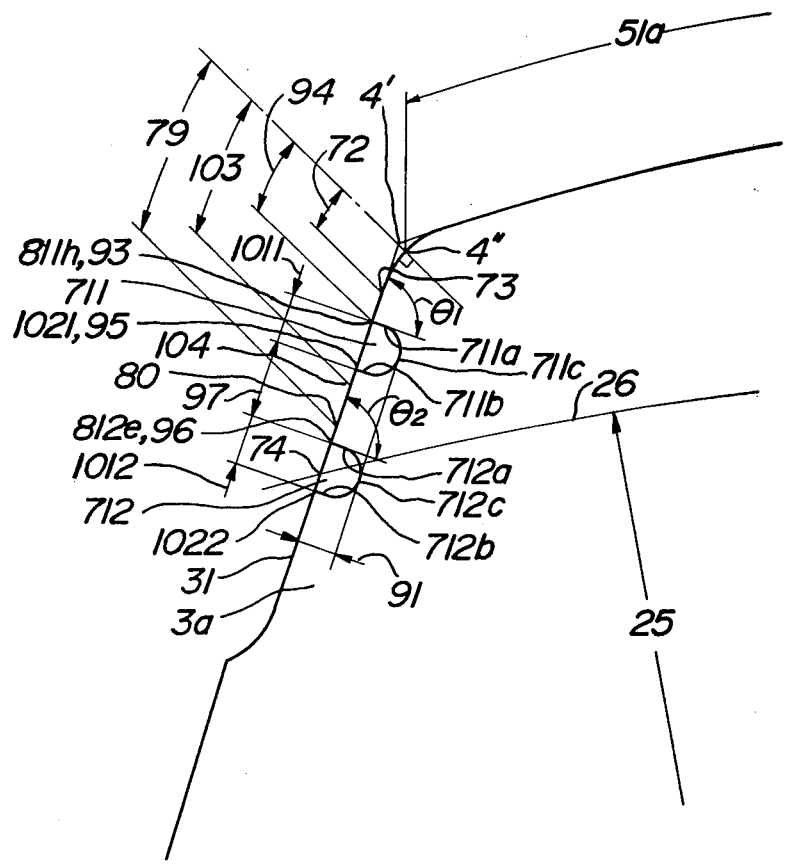
FIG. 4f is a section on line D—D of FIG. 4d.
Figure 4G:
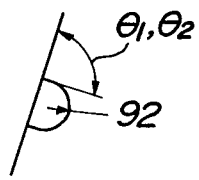
FIG. 4g is a section on lines E—E and F—F of FIG. 4d.
Figure 4H:
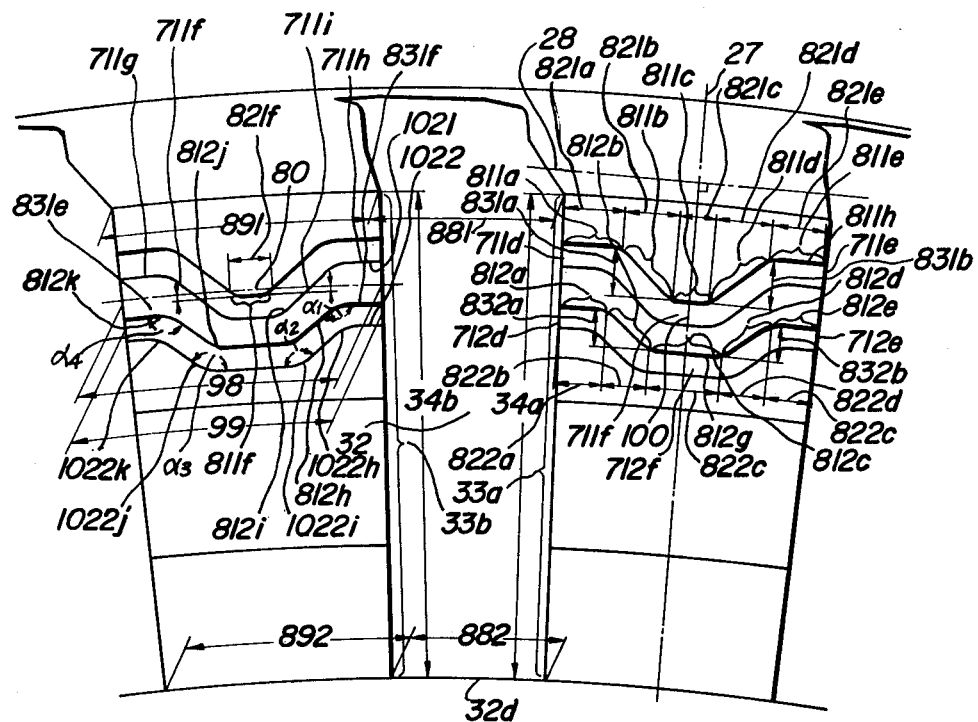
FIG. 4h is a side elevational view of a sidewall near a shoulder.
Figure 5A:
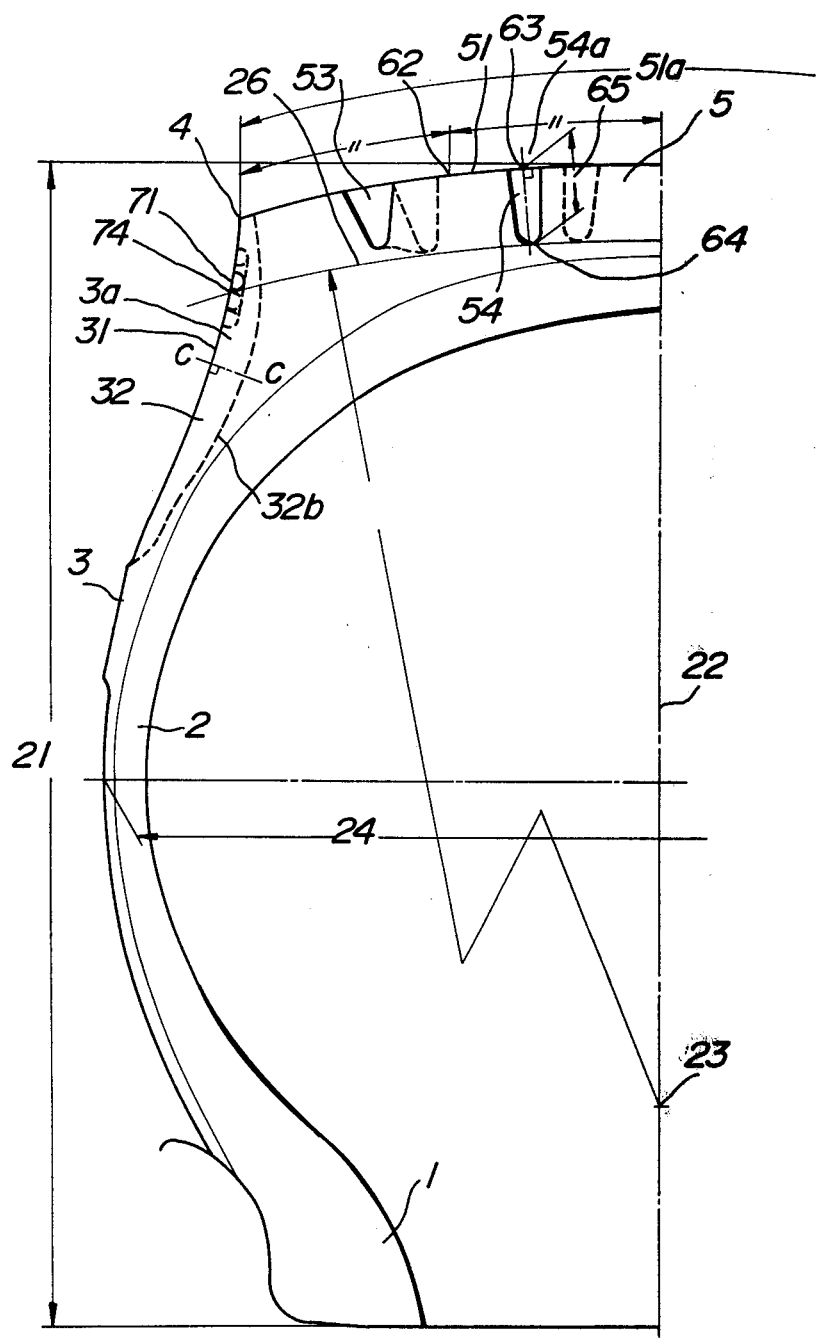
FIG. 5a is a cross-sectional view of another embodiment of a tire according to the present invention.
Figure 5B:
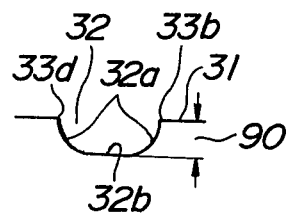
Figure 5C:
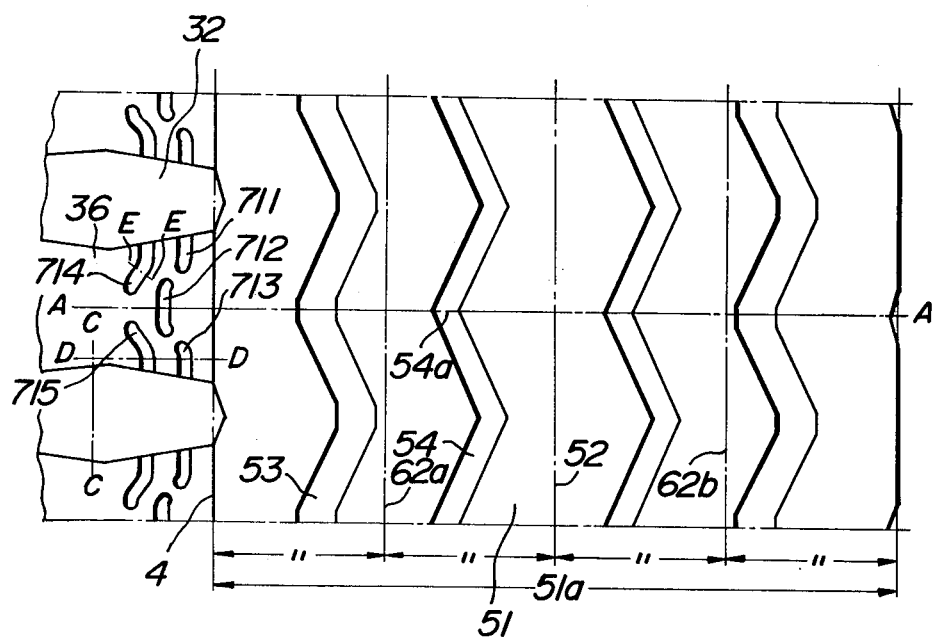
FIG. 5c is a development view of a crown portion and a sidewall near a shoulder.
Figure 5D:
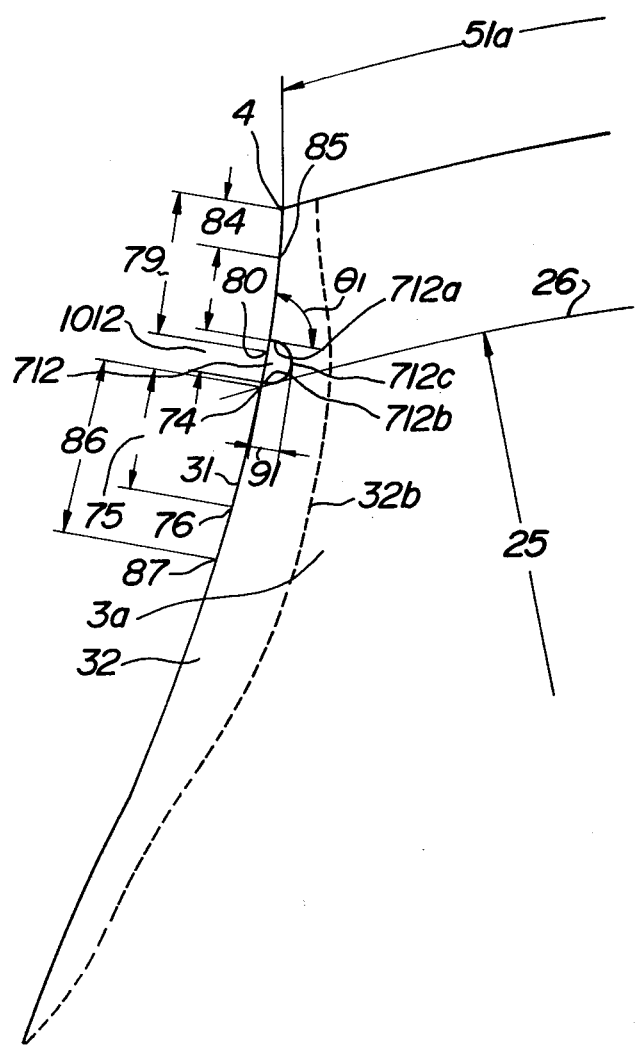
FIG. 5d is a section on line A—A of FIG. 5c.
Figure 5E:
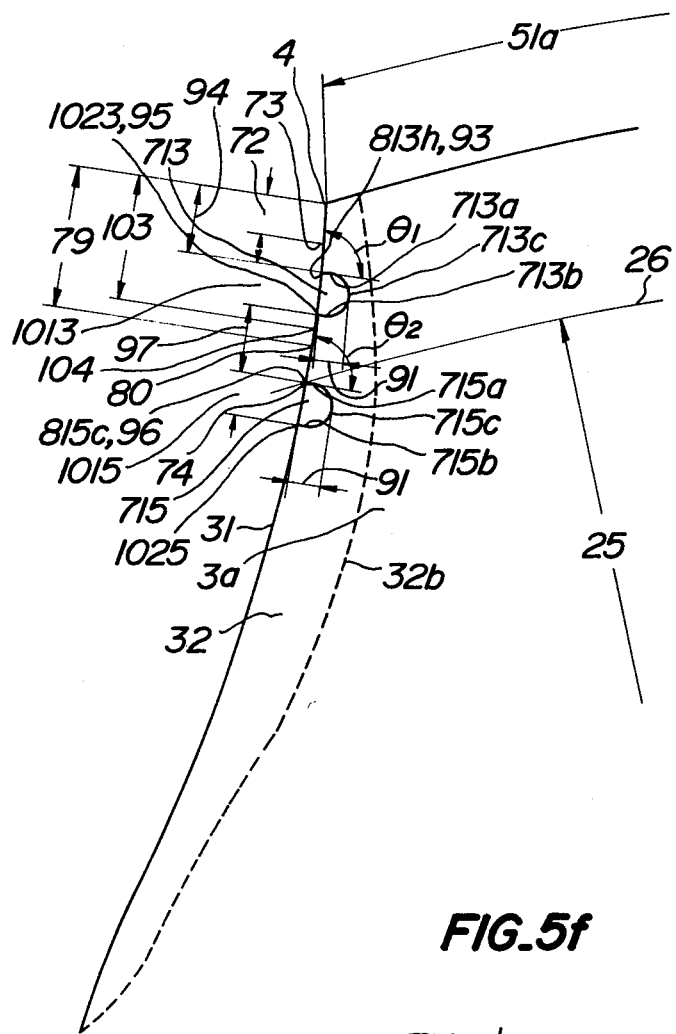
FIG. 5e is a section on line D—D of FIG. 5c.
Figure 5F:
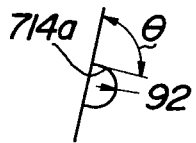
FIG. 5f is a section on line E—E of FIG. 5c.
Figure 5G:
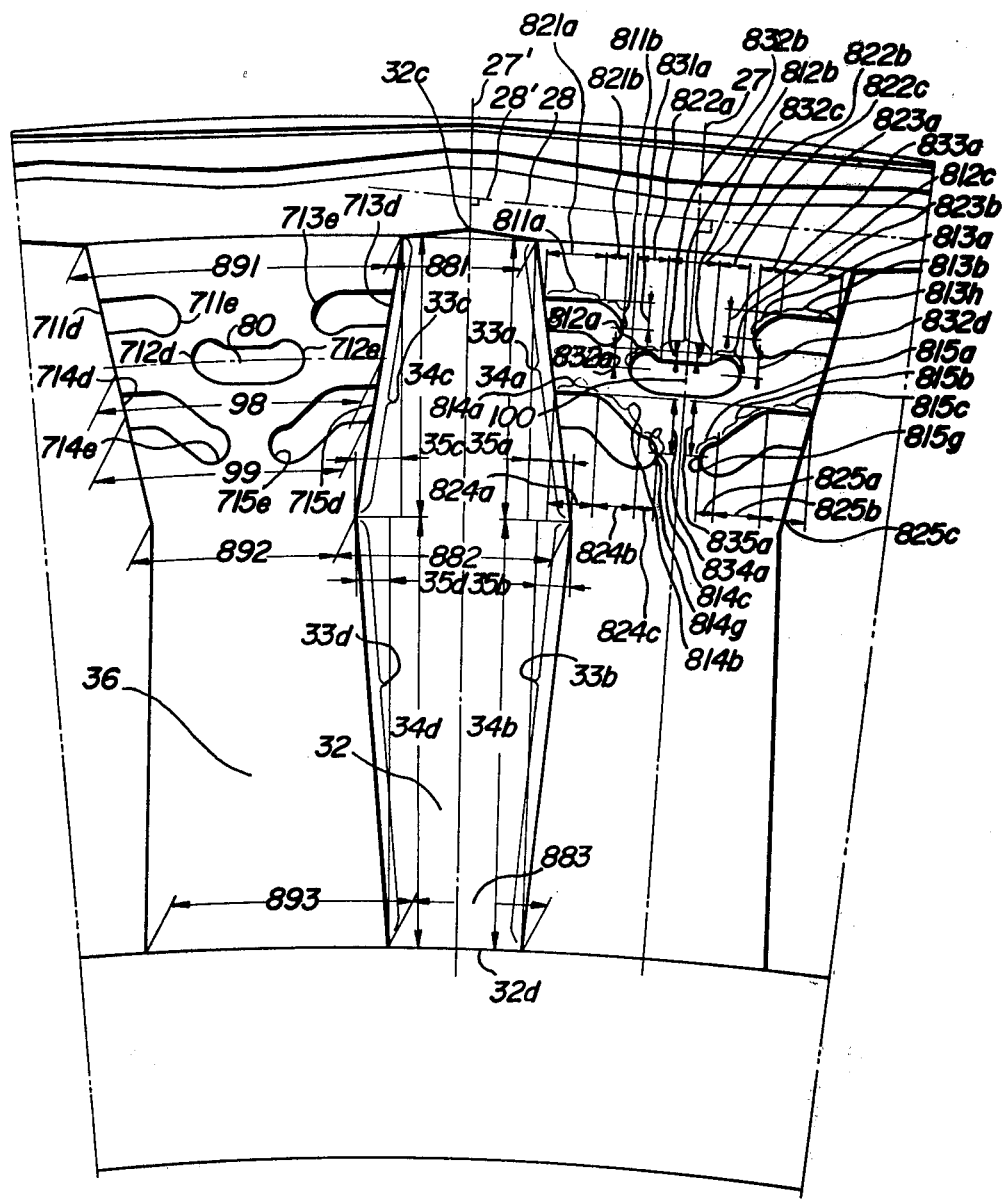
FIG. 5g is a side elevational view of a sidewall near a shoulder.
Figure 6:
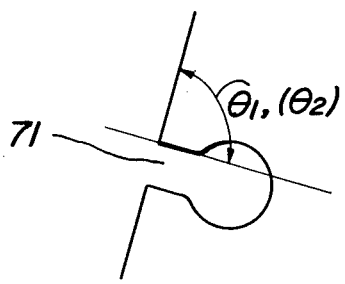
FIG. 6 is cross-sectional view of a modified embodiment of a shoulder side groove.
Figure 7:
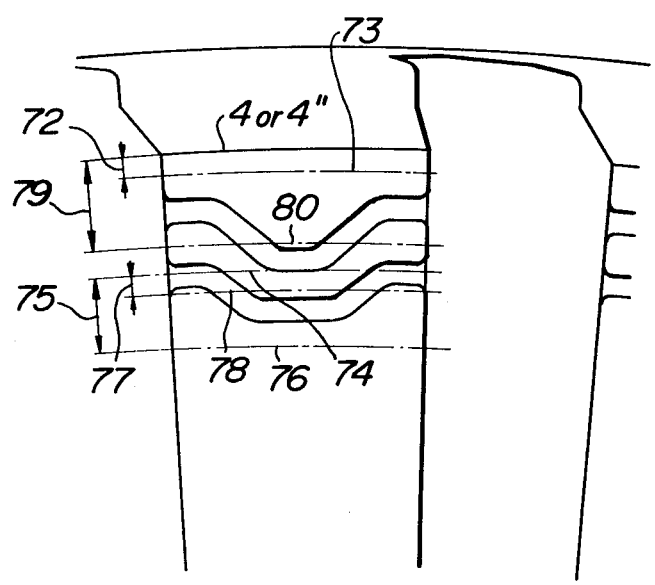
FIG. 7 is a side elevational view of a reference line associated with the invention shown in FIG. 4h.
Figure 8:
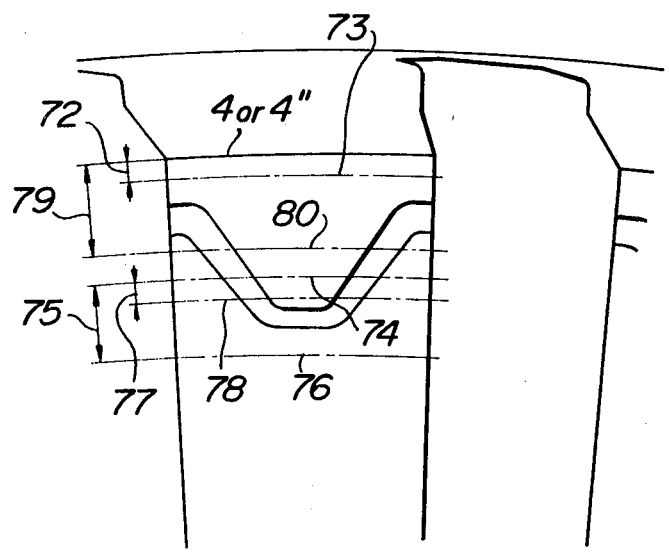
Figure 9:
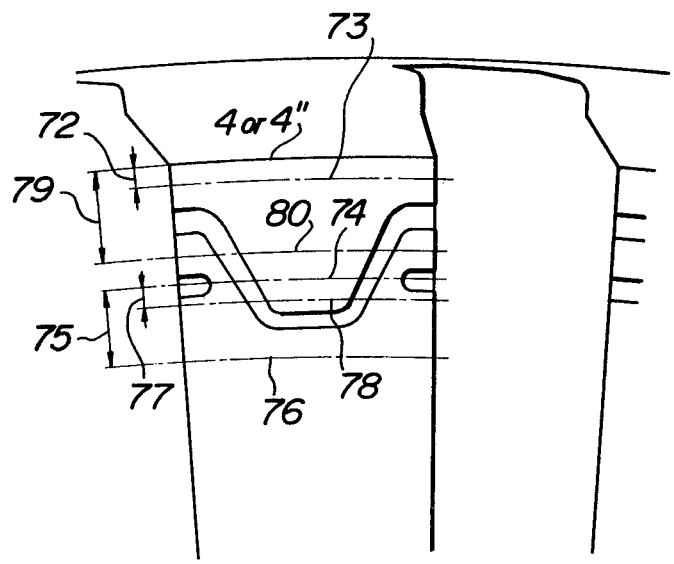
Figure 10:
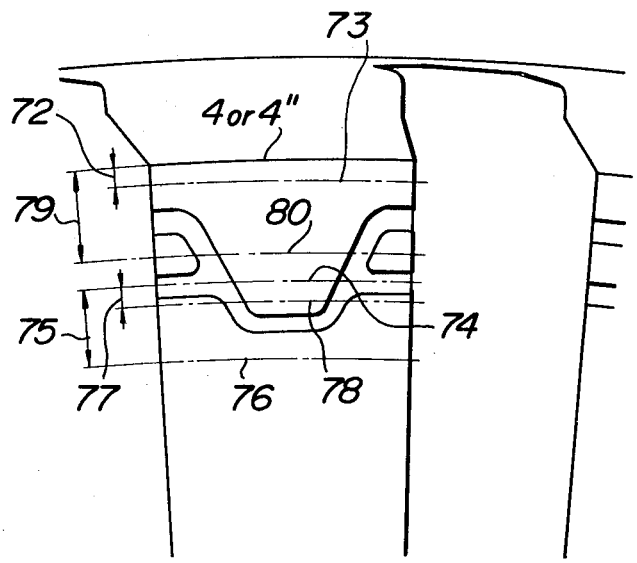
Figure 11:
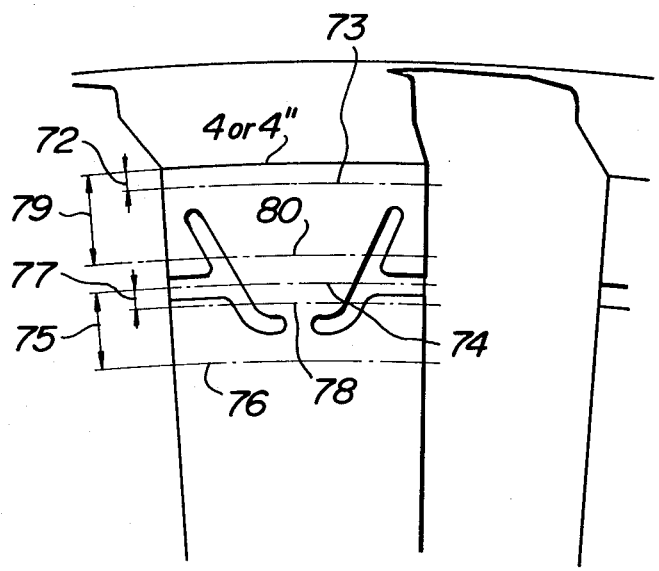
Figure 14:
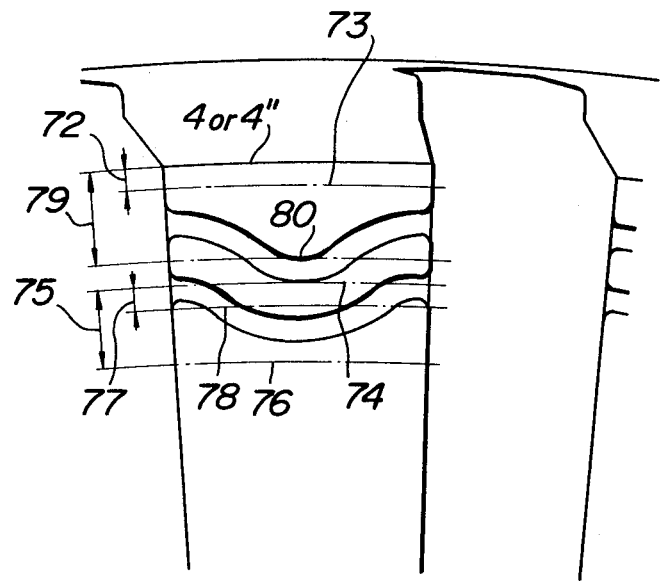
Figure 15:
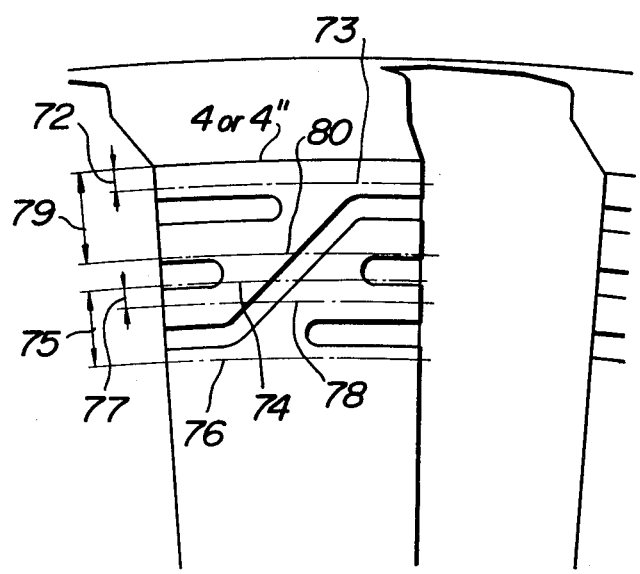
Figure 16:
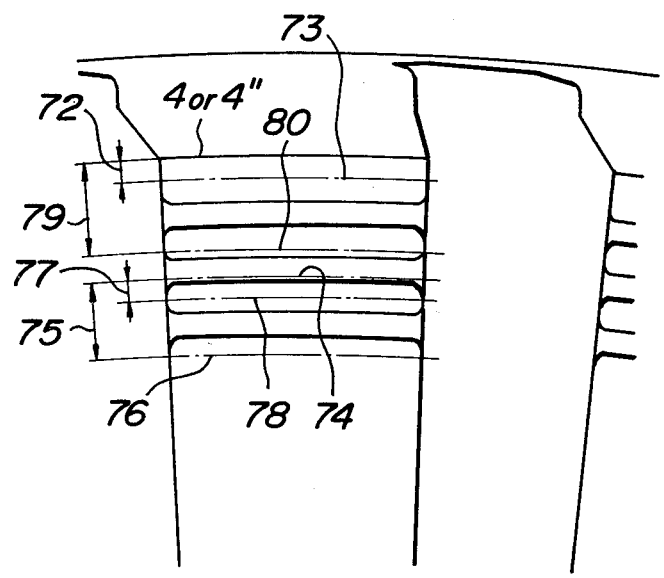
Figure 17:
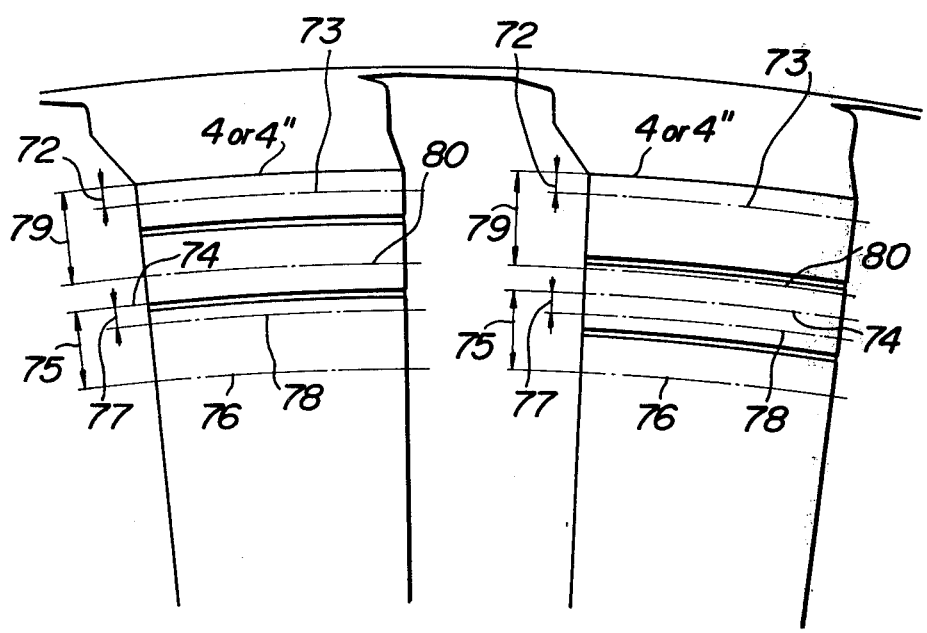
Figure 18:
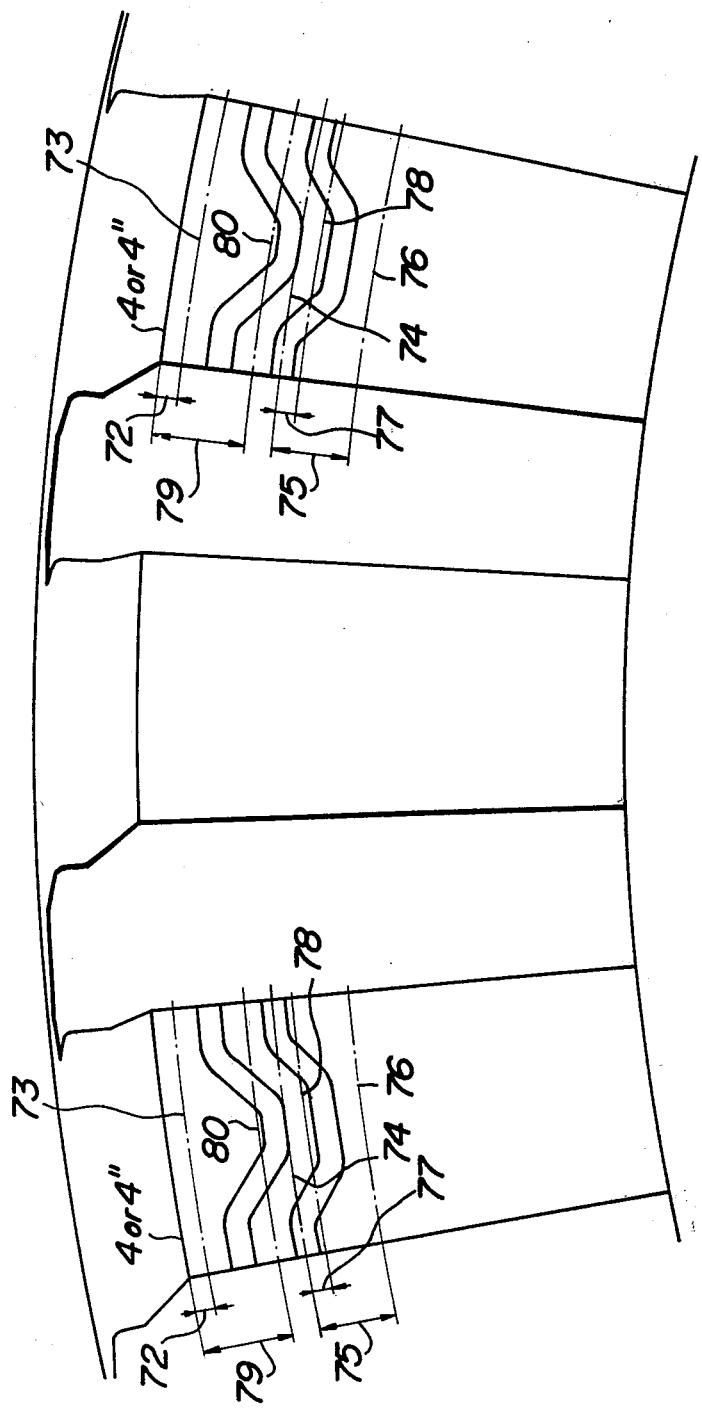
Figure 19:
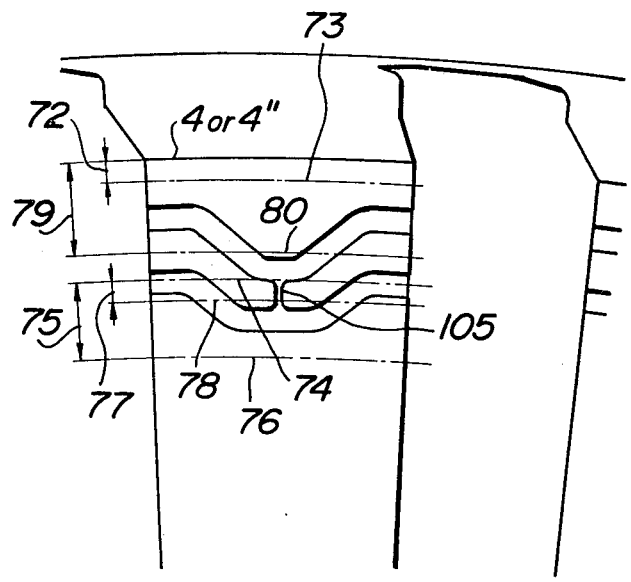
Figure 20:
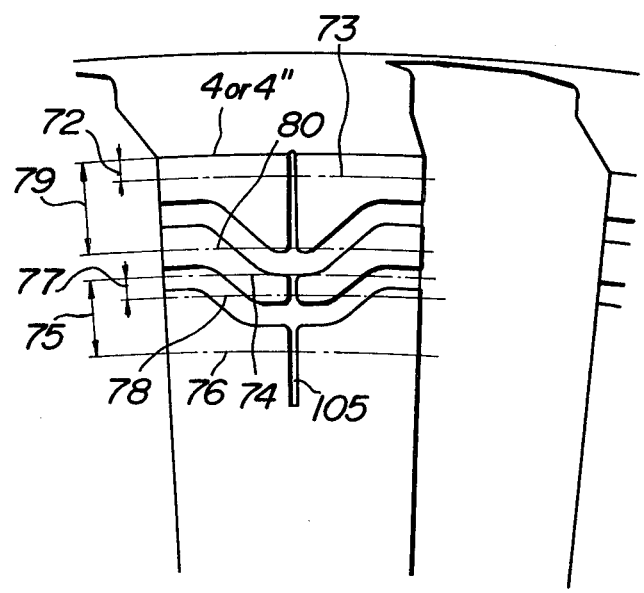
Figure 21:
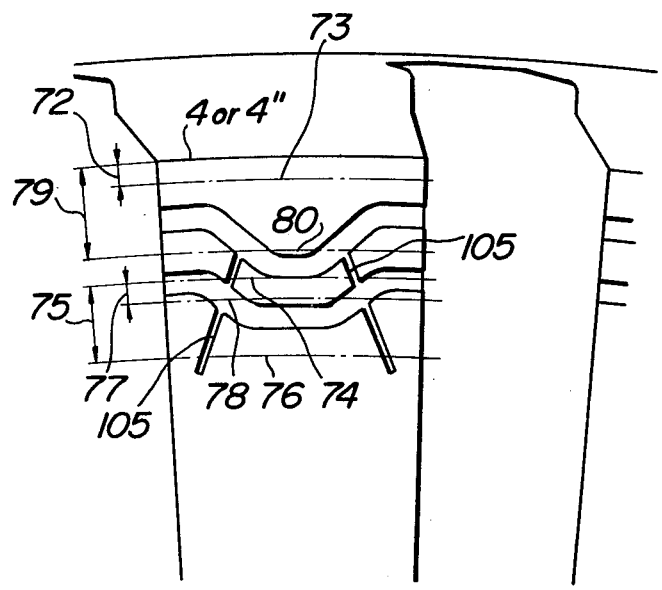
Figure 22:
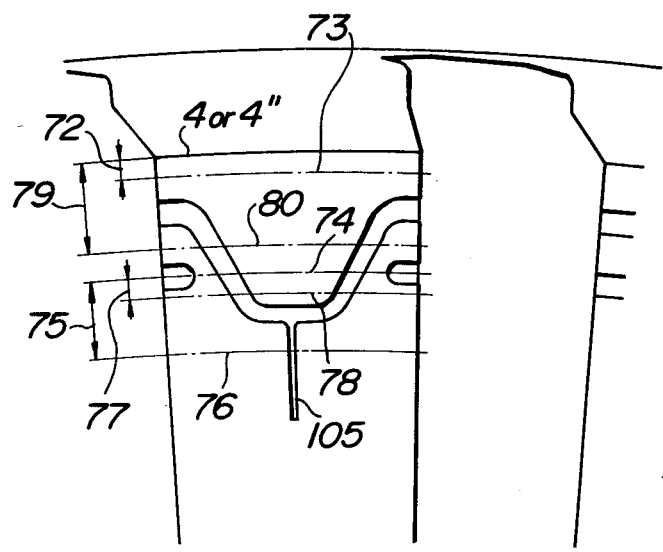

The construction, arrangement and function of the pneumatic tire according to the invention will now be described with reference to embodiments thereof. FIG. 4a shows a representative embodiment of a lug pattern tire according to the invention in section taken on the equatorial plane of the tire, FIG. 4b shows a crown portion groove in section, FIG. 4c shows a depression in section, FIG. 4d shows development of a tread surface inclusive of a tire sidewall near the shoulder, FIGS. 4e to 4g show shoulder side grooves in section, FIG. 4h shows a tire sidewall near the shoulder, FIG. 5a shows a representative embodiment of a rib pattern according to the invention in section on the equatorial plane of the tire. FIG. 5b shows its depression in section, FIG. 5c shows development of a tread surface inclusive of a tire sidewall near the shoulder, FIGS. 5d to 5f show shoulder side grooves in section, and FIG. 5g shows a tire sidewall near the shoulder.

In the present invention, first, in order to attain the object, it is necessary to prevent the overall durability and low noise property of the tire from being degraded. For this purpose, in the present invention, the tread rubber is provided at its land portion 36 of a tire sidewall 3a near the shoulder with a shoulder side groove 71 (711, 712, 713 . . . ). The shoulder side groove 71 is composed of at least one groove open to the tire sidewall outer surface 31 and arranged such that the total sum of those lengths 821a, 821b, 812c, 821d, 821e, 822a, 822b, 822c, 822d, 822e or 821a, 821b, 822a, 822b, 822c, 823a, 823b, 824a, 824b, 824c, 825a, 825b, 825c, of groove edge lines 811a, 811b, 811c, 811d, 811e, 812a, 812b, 812c, 812d, 812e or 811a, 811b, 812a, 812b, 812c, 813a, 813b, 814a, 814b, 814c, 815a, 815b, 815c formed between the groove walls 711a, 712a or 711a, 712a, 813a, 714a, 715a located at the shoulder side or the side to which acts the centripetal force and the tire sidewall outer surface 31, which are projected onto a plane 28 perpendicular to both the radial plane 27 containing the rotational axis of the tire and the tire equatorial plane for circumferentially dividing the land interposed between adjacent depressions in two halves is at least larger, preferably at least 1.5 times larger than the total sum of those lengths 831a, 831b, 832a, 832b or 831a, 832a, 832b, 832c, 832d, 833a, 834a, 835c of the above mentioned portions projected onto the radial plane 27 containing the rotational axis of the tire. Second, the above mentioned groove edge lines are located at a position which is nearer to the bead portion than a tire sidewall outer surface point 73 (FIGS. 4f and 5e) distant apart from the shoulder 4" or 4 by a distance 72 along the tire sidewall outer surface 31 which is 0.0123 times, preferably 0.0176 times the tire sectional height 21, that is, $$\left( \frac{\text{Tire Outer Dia.} - \text{Rim Dia.}}{2} \right).$$

Third, those portions 812g, or 814g, 815g (FIGS. 4h and 5g) of the groove edge lines which are the nearest to the bead portion are located between a tire sidewall outer surface point 78 spaced apart from a crossing point 74 between an arc 26 having a radius of curvature 25 which has a center on a tire width center line 22 (FIGS. 4a and 5a) in the radial plane containing the rotational axis of the tire and which is 1.55 times larger than the tire maximum sectional width 24 and passing through the groove base 64 at a crown portion groove measuring position 63 and the tire sidewall outer surface 31 toward the bead portion 1 along the tire sidewall outer surface 31 by a distance 77 (FIG. 4e) which is 0.0123 times, preferably 0.0176 times the tire sectional height 21 on the one hand and a tire sidewall outer surface point 76 spaced apart from the above mentioned crossing point 74 toward the bead portion 1 along the tire sidewall outer surface 31 by a distance which is 0.0483 times, preferably 0.0372 times the tire sectional height 21 on the other hand. Fourth, the total sum of those lengths 821f, 822a, 822b, 822c, 822d, 822e or 824a, 824b, 824c, 825a, 825b, 825c of the above mentioned groove edge lines interposed between a tire sidewall outer surface point 80 distant apart from the shoulder 4" or 4 in the radial plane containing the rotational axis of the tire toward the bead portion 1 along the tire sidewall outer surface 31 by a distance 79 which is 0.80 times the crown portion groove depth 65 and those portions 812g or 814g, 815g of the groove edge lines which are located in the above mentioned limited range and are the nearest to the bead portion, which are projected onto a plane 28 perpendicular to both the radial plane 27 containing the rotational axis of the tire and the equatorial plane is at least 1.1 times, preferably at least 1.5 times larger than the total sum of those lengths 831e, 831f, 832a, 832b or 834a, 835a of the groove edge lines which are projected onto the radial plane 27 containing the rotational axis of the tire. Finally, the shoulder side groove walls 71a (711a, 712a, . . .) in section on lines A—A, D—D, E—E, F—F in FIG. 4d are inclined at angles $\theta_1$, $\theta_2$ of at most 120°, preferably at most 110° with respect to the tire sidewall outer surface 31.

In the present invention, the dimensions of various parts shall be understood to mean those obtained when the tire is inflated and the crown portion groove depth shall be understood to mean a groove depth 65 (FIG. 4a) measured on a line drawn from a crown portion groove depth measuring position 63 in a direction perpendicular to an arc 51a of a tread surface 51, and the crown portion groove depth measuring position shall be understood to mean the deepest portion of the crown portion groove on two lines 62a, 62b (FIG. 4d) located at both sides of a tire equatorial line 52 and for dividing an arc 51a of the tread surface 51 between two shoulders of the tire into four equal portions. If the groove is absent on the two lines 62a, 62b, the crown portion groove depth measuring position shall be understood to mean a position 54a (FIG. 5c) which is nearest to the deepest portion of the crown portion grooves 53, 54 which are the nearest to these lines 62a, 62b. If the deepest depths of the crown portion grooves located at both sides of these lines 62a, 62b are equal with each other, the crown portion groove depth measuring position shall be understood to mean that of the groove which is near the tire equatorial line 52. In addition, one groove edge line shall be understood to mean one groove edge line extending continuously from one end to the other end thereof even when the groove edge line is composed of a straight line, bent line, curved line or a combination of these lines.

In the present invention, provision is made of at least one shoulder side groove 71 located at a position within the above described limited range of the tire sidewall 3a near the shoulder for the purpose of improving the anti-transverse skid property of the tire. If the grooves or narrow grooves provided in the crown portion 5 are made large in number or complex in configuration, the low noise property and durability of the tire become degraded to an unallowable extent. On the contrary, if the shoulder side groove 71 is located at the tire sidewall 3a near the shoulder, the effect of improving the anti-transverse skid property becomes comparable with that attained when the grooves are located in the crown portion 5 without degrading the low noise property and durability of the tire.

If the total sum of those lengths 821a, 821b, 821c, 821d, 821e, 822a, 822b, 822c, 822d, 822e (FIG. 4h) or 821a, 821b, 822a, 822b, 822c, 823a, 823b, 824a, 824b, 824c, 825a, 825b, 825c, (FIG. 5g) of the groove edge lines 811a, 811b, 811c, 811d, 811e, 812a, 812b, 812c, 812d, 812e (FIG. 4h) or 811a, 811b, 812a, 812b, 812c, 813a, 813b, 814a, 814b, 814c, 815a, 815b, 815c (FIG. 5g) which are projected onto the plane 28 perpendicular to both the radial plane 27 containing the rotational axis of the tire and the tire equatorial plane is made smaller than the total sum of those lengths 831a, 831b, 832a, 832b (FIG. 4h) or 831a, 832a, 832b, 832c, 832d, 833a, 834a, 835a (FIG. 5g) of the above mentioned portions projected on the equatorial cross-sectional plane 27, the effect of improving the anti-transverse skid property becomes significantly reduced, so that the former total sum is made at least larger than the latter total sum.

If the groove edge line is located at a position which is nearer to the shoulder than the above mentioned limited range, the durability of the tire becomes degraded and the effect of improving the anti-transverse skid property becomes significantly degraded with respect to its everlasting property. As a result, the groove edge lines are located at the above defined position.

If those portions 812g or 814g, 815g of the groove edge lines which are the nearest to the bead portion are located at a position which is nearer to the shoulder than the above described range, the above described effect of the shoulder side groove could not be displayed. This is because of the fact that the anti-transverse skid property of the conventional tire becomes degraded as the wear of the tire advances, so that the above mentioned effect of the shoulder side groove should be displayed at the end of the wear of the tire. But, all the groove edge lines disappear at the end of the wear of the tire.

If those portions 812g or 814g, 815g of the groove edge lines which are the nearest to the bead portion are located at a position which is nearer to the bead portion than the above described limited range, these groove edge lines do not make contact with ground at all. These groove edge lines exert no effect of improving the anti-transverse skid property of the tire. In addition, the strain produced in the tire sidewall 3a near the shoulder when the tire runs under load becomes larger at a position near the bead portion and becomes suddenly increased when the groove edge lines are located at a position which is nearer to the bead portion than the above defined limited range. As a result, the shoulder side groove 71 is subjected to unallowable local concentration of the strain. Moreover, the thickness of rubber of the tire sidewall 3a near the shoulder becomes suddenly decreased at a position near the bead portion. As a result, the limited range near the bead portion is determined to the above mentioned position.

If the total sum of those lengths 821f, 822a, 822b, 822c, 822d, 822e, 824a, 824b, 824c, 825a, 825b, 825c of all the groove edge lines located at a position nearer to the bead portion than the tire sidewall outer surface point 80 spaced apart from the shoulder 4″ or 4 on the radial plane containing the rotational axis of the tire toward the bead portion 1 on the tire sidewall outer surface 31 by a distance 79 which is 0.80 times the crown portion groove depth 65, which are projected onto the plane 28 perpendicular to both the radial plane 27 containing the rotational axis of the tire and the tire equatorial plane is made smaller than 1.1 times the total sum of those lengths 831e, 831f, 832a, 832b, or 834a, 835a of the groove edge lines which are projected onto the radial plane 27 containing the rotational axis of the tire, the effect of improving the anti-transverse skid property of the tire becomes significantly decreased. As a result, the above described former total sum is made at least 1.1 times larger than the latter total sum.

Also, if the above described angles $\theta_1$, $\theta_2$ is larger than 120°, the rigidity of portion near the above mentioned groove edge line becomes so large that these portions are prevented from contacting the ground surface. Not only is hysteresis loss produced due to the deformation of rubber in these portions, but also the ionic coupling between the rubber molecule and ground surface molecule are considerably decreased, thereby significantly decreasing the effect of improving the anti-transverse skid property. This is the reason why the above mentioned angles are determined to at most 120°.

If the rigidity of the shoulder portion is made excessively high, the above mentioned edge line of the above mentioned shoulder side groove is prevented from effectively contacting with the ground when the tire runs along the curved course. As a result, the effect of improving the anti-transverse skid property could not be demonstrated. On the contrary, if the rigidity of the shoulder portion is made excessively low, the durability of the tire is considerably degraded and not only the resistance to wear but also stable maneuverability become poor, so that these properties of the tire must be corrected.

For this purpose, in the present invention, provision is made of elongate depressions 32 open at the tire sidewall outer surface and satisfying the following conditions.

(1) The depression 32 is located within a range between a tire sidewall outer surface point 85 which is spaced apart from the shoulder 4″ or 4 on at least the radial plane containing the rotational axis of the tire by a distance 84 which is 0.0186 times smaller than the tire sectional height 21 and a tire sidewall outer surface point 87 distant apart from a crossing point 74 of the arc 24 passing through the groove base 64 at the crown portion groove depth measuring position 63 and having a radius of curvature 25 which has a center 23 located on the tire width center line 22 on the radial plane containing the rotational axis of the tire and which is 1.55 times larger than the tire maximum sectional width with the tire sidewall outer surface 31 by a distance 86 along the tire sidewall outer surface 31 which is 0.060 times smaller than the tire sectional height 21.

(2) The elongate depression 32 has a width 88 (881, 882, 883) which is 0.42 to 1.25 times, preferably 0.48 to 0.95 times the width 89 (89$_1$, 89$_2$, 89$_3$) of a land portion 36 and which is measured at the same point in substantially overall region of the depression in the same direction.

(3) The depression 32 has a depth 90 which is at least 1.5 times, preferably at least 2.0 times larger than the shoulder sidewall depth which is located at the same position as the shoulder side groove 71.

(4) The total sum of those lengths 34*a*, 34*b* or 34*a*, 34*b*, 34*c*, 34*d* of edge lines 33*a*, 33*b* or 33*a*, 33*b*, 33*c*, 33*d* formed between depression walls 32*a* and the tire sidewall outer surface 31, which are projected onto a radial plane 27' containing the rotational axis of the tire and for dividing the depression 32 into two halves is made at least 2.2 times, preferably at least 3.3 times larger than the total sum of those lengths 35*a*, 35*b*, 35*c*, 35*d* which are projected on the plane 28' perpendicular to both the radial plane 27' containing the rotational axis of the tire and the tire equatorial plane.

The use of the depression 32 defined as above described ensures a rotationalization of the rigidity of the shoulder portion and provides the important advantage that the above mentioned edge line of the above mentioned shoulder side groove is effectively brought into contact with the ground when the tire runs along the curved course and that the durability, resistance to wear and stable maneuverability of the tire can sufficiently be maintained. The depression 32 may communicate with the grooves 53 or 53, 54 or narrow grooves provided in the crown portion. Alternatively, the depression 32 may be independent of these grooves or narrow grooves.

As described above, the upper end 32*c* of the above mentioned depression 32 which is near the shoulder portion is located at a position which is nearer than the above described position 85 (FIGS. 4*e*, 5*d*) to the bead portions. This is because of the fact that if the upper end 32*c* of the depression 32 is located at a position which is nearer than the position 85 to the shoulder 4, the rigidity of the shoulder portion could not be corrected and the water drainage at the shoulder portion could not sufficiently be improved. As a result, the upper end 32*c* of the depression 32 is located at the above described position which is near the bead portion. In addition, the lower end 32*d* of the depression 32 which is near the bead portion is located at a position which is nearer than the above described position 87 to the shoulder portion. This is because if the lower end 32*d* of the depression 32 is located at a position which is nearer than the position 87 to the shoulder 4, the same drawback as that described above is induced. As a result, the lower end 32*d* of the depression 32 is located at the above described position which is nearer than the above described position 87 to the shoulder portion.

If the ratio of the depression width 88 to the land portion width 89 exceeds 1.25, the rigidity of the shoulder portion becomes too low, thereby significantly degrading the durability of the tire and also degrading the resistance to wear and stable maneuverability of the tire. As a result, the upper limit of the above mentioned width ratio is made 1.25.

If the width ratio is smaller than 0.42, the rigidity of the shoulder portion could not be optimized. In addition, the water drainage property of that portion of the tire sidewall 3*a* which is near the shoulder could not sufficiently be improved, so that the lower limit of the above mentioned width ratio is made 0.42.

If the depression 32 is variable in pitch, use is made of an average value of the widths of these portions of the land portions which are located at both sides of the depressions for the purpose of deriving by calculation the ratio of the depression width 88 to the land portion width 89. In addition, the depression depth 90 and the shoulder sidewall depth 91 shall be understood to mean those depths of the depression 32 and shoulder side groove 71 which are measured in a direction perpendicular to the tire sidewall outer surface 31. Moreover, the shoulder side groove depth shall be understood to mean the average value of the groove depths 91 provided in the overall region of respective shoulder side grooves.

If the depression depth 90 is smaller than 1.5 times the shoulder side groove depth at the same position as the shoulder side groove 71, the above mentioned drawback encountered when the shoulder side groove is narrow. This is the reasons why the lower limit of the depression depth 90 is made 1.5 times the shoulder side groove depth 91.

If the total sum of the lengths 34*a*, 34*b* (FIG. 4*h*) or 34*a*, 34*b*, 34*c*, 34*d* (FIG. 5*g*) of those portions of the edge lines 33*a*, 33*b* (FIG. 4*h*) or 33*a*, 33*b*, 33*c*, 33*d* (FIG. 5*g*) formed between the depression wall 32*c* and the tire sidewall outer surface 31 which are projected onto the radial plane 27' containing the rotational axis of the tire is smaller than 2.2 times the total sum of the lengths 35*a*, 35*b*, 35*c*, 35*d* (FIG. 5*g*) of those portions of the above mentioned edge lines which are projected onto the plane 28' perpendicular to both the radial plane 27' containing the rotational axis of the tire and the tire equatorial plane, it is impossible to sufficiently correct the shoulder portion rigidity and eventually the durability of the tire is significantly decreased. This is the reason why the lower limit of the above mentioned ratio is made 2.2.

Next, in order to cause the edge line of the shoulder side groove 71 to effectively make contact with ground to sufficiently demonstrate its effect, the water drainage property of the tire sidewall 3*a* near the shoulder must be improved. Concerning this point, first, provision is made of the above mentioned depression 32 for the purpose of correcting also the rigidity of the shoulder portion and at least one portion of at least one end 711*d*, 712*d*, (FIG. 4*h*) or 711*d*, 713*d*, 714*d*, 715*d* (FIG. 5*g*) of the shoulder side grooves 711, 712 (FIG. 4*h*) or 711, 713, 714, 715 (FIG. 5*g*) is in communication with the depression 32, the above mentioned shoulder side grooves 711, 712 or 711, 713, 714, 715 having the total sum of the lengths 821*a*, 821*b*, 821*c*, 821*d*, 821*e*, 822*a*, 822*b*, 822*c*, 822*d*, 822*e* or 821*a*, 821*b*, 823*a*, 823*b*, 824*a*, 824*b*, 824*c*, 825*a*, 825*b*, 825*c* of those portions of the total edge line 811*a*, 811*b*, 811*c*, 811*d*, 811*e*, 812*a*, 812*b*, 812*c*, 812*d*, 812*e* or 811*a*, 811*b*, 812*a*, 812*b*, 812*c*, 813*a*, 813*b*, 814*a*, 814*b*, 814*c*, 815*a*, 815*b*, 815*c* which are projected onto the plane 28 perpendicular to both the radial plane 27 containing the rotational axis of the tire and the tire equatorial plane, total sum being at least 0.5 times the total sum of the same lengths 821*a*, 821*b*, 821*c*, 821*d*, 821*e*, 822*a*, 822*b*, 822*c*, 822*d*, 822*e* or 821*a*, 812*b*, 822*a*, 822*b*, 822*c*, 823*a*, 823*b*, 824*a*, 824*b*, 824*c*, 825*a*, 825*b*, 825*c*. In other words, in the embodiment shown in FIG. 5, in the same land, the total sum of the lengths 821*a*, 821*b*, 823*a*, 823*b*, 824*a*, 824*b*, 824*c*, 825*a*, 825*b*, 825*c* of those portions of the above mentioned edge lines 811*a*, 811*b*, 813*a*, 813*b*, 814*a*, 814*b*, 814*c*, 815*a*, 815*b*, 815*c* of the shoulder side grooves 711, 713, 714, 715 at least one portion of at least one end of which communicates with the above mentioned depression 32 and which are projected onto the plane 28 perpendicular to both the radial plane 27 containing the rotational axis of the tire and the tire equatorial plane is made at least 0.5 times the total sum of the lengths 821a, 821b, 822a, 822b, 822c, 823a, 823b, 824a, 824c, 825a, 825b, 825c of those portions of the above mentioned all the edge lines 811a, 811b, 812a, 812b, 812c, 813a, 813b, 814a, 814b, 814c, 815a, 815b, 815c of all the shoulder side grooves 711, 712, 713, 714, 715 which are projected onto the plane 28 perpendicular to both the radia plane 27 containing the rotational axis of the tire and the tire equatorial plane.

In the same land portion, if the total sum of the lengths 822a, 822b, 822c of those portions of the front and rear edge lines 812a, 812b, 812c of the shoulder side groove 712 not communicating at their ends 712d, 712e with the depression and remained in the land portion 36 which are projected onto the plane 28 perpendicular to both the radial plane 27 containing the rotational axis of the tire and the tire equatorial plane exceeds 0.5 times the total sum of the lengths 821a, 821b, 822a, 822b, 822c, 823a, 823b, 824a, 824b, 824c, 825b, 825c of those portions of the above mentioned edge lines 811a, 811b, 812a, 812b, 812c, 813a, 813b, 814a, 814b, 814c, 815a, 815b, 815c of all the shoulder side grooves 711, 712, 713, 714, 715 which are projected onto the plane 28 perpendicular to both the radial plane 27 containing the rotational axis of the tire and the tire equatorial plane, water entering into the shoulder side groove 712 both ends 712d, 712e of which are not communicating with the depression 32 could not escaped therefrom, so that the tire as a whole does not show a good drainage property. As a result, it is impossible to completely severe the water film formed between the ground surface and the tire sidewall 3a near the shoulder, thereby significantly decreasing the effect of improving the anti-transverse skid property of the tire.

In order to maintain the durability of the tire, provision must be made of means for preventing the strain from locally concentrating onto the tire sidewall 3a near the shoulder. Concerning this point, the depth of the shoulder side groove is made smaller than 0.0225 times, preferably 0.0155 times the tire sectional height 21 and the groove wall 71a (711a, 712a . . . ). 71b (711b, 712b . . . ) on the sectional plane of the shoulder side groove 71 is connected through an arc 92 (FIG. 4g or FIG. 5f) to the groove base 71c (711c, 712c . . . ), the arc 92 having a minimum radius of at least 1 mm. This arc 92 may be a single one or composed of a plurality of arcs connected with each other. If use is made of the arc 92 composed of a plurality of arcs connected with each other, the radius of the smallest arc is made at least 1 mm.

If the depth of the shoulder side wall exceeds 0.0225 times the tire sectional height 21, the local strain produced near the groove base 71c becomes significantly increased, so that the upper limit of th depth of the shoulder sidewall is made 0.0225 times the sectional height 21 of the tire.

If the minimum radius of the arc connecting the groove wall 71a, 71b in the sectional plane of the shoulder sidewall to the groove base 71c is smaller than 1 mm, the local strain produced near the groove base 71c also becomes considerably increased, so that the lower limit of the minimum radius of the above mentioned arc is made 1 mm.

It is a matter of course that the effect of improving the anti-transverse skid property must last throughout the tire life, and as a result provision must be made of means of maintaining such effect of improving the anti-transverse skid property. Concerning this point, in the first place, the depth of the shoulder side groove is made at least 0.0070 times, preferably at least 0.0088 times the tire sectional height 21. Secondly, the angles $\theta_1$, $\theta_2$ formed between the shoulder side groove wall 71a (711a, 712a, . . . ) in the sections on lines A—A, D—D, E—E, F—F and the tire sidewall outer surface 31 are made at least 75°, preferably at least 80°. Third, the distance 94 along the sidewall outer surface 31 from the shoulder 4″ (FIG. 4f) or 4 (FIG. 5e) in the radial plane containing the rotational axis of the tire to a crossing point 93 between the groove walls 711a, 713a of the shoulder sidewalls 711, 713 nearest to the shoulder and the tire sidewall outer surface 31 is made at least 0.0123, preferably at least 0.0176 times the tire sectional height 21. Finally, if provision is made of a plurality of shoulder side grooves in the same radial plane containing the rotationa axis of the tire, the distance 97 from a crossing point 95 between the groove wall 71b (711b, 712b, . . . ) near the bead portion of all the shoulde side groove in the radial plane containing the rotational axis of the tire and the sidewall outer surface 31 to a crossing point 96 between the groove wall 71a (712a, 714a, . . . ) near the shoulder of the other shoulder side groove which is adjacent to the bead portion and the tire sidewall outer surface 31 is made at least 0.0123 times, preferably at least 0.0176 times the tire sectional height 21.

In order to obtain the continuous effect of improving the anti-transverse skid property of the tire, the above mentioned edge line 81 (811, 812, . . . ) of the above mentioned shoulder side groove 71 must not disappear within a short duration due to wear or crack or the like. This is the reason why the above mentioned values are made the respective lower limits.

The preferable modes of carrying out the invention will now be described.

In order to further improve the anti-transverse skid property of the tire, it is preferable that the total sum of those lengths 821a, 821b, 821c, 821d, 821e, 822a, 822b, 822c, 822d, 822e (FIG. 4h) or 821a, 821b, 823a, 823b, 824a, 824b, 824c, 825a, 825b, 825c (FIG. 5g) of the above described edge lines 811a, 811b, 811c, 811d, 811e, 812a, 812b, 812c, 812d, 812e (FIG. 4h) or 811a, 811b, 812a, 812b, 812c, 813a, 813b, 814a, 814b, 814c, 815a, 815b, 815c (FIG. 5g) of the above described shoulder side groove 711, 712 (FIG. 4h) or 711, 712, 713, 714, 715 (FIG. 5g) in the same land portion which are projected onto the plane 28 perpendicular to both the radial plane 27 containing the rotational axis of the tire and the tire equatorial plane is made at least 0.5 times, preferably at least 1.0 times the average width 98 (FIG. 4h) of those portions of the land which are provided with the above described shoulder side grooves and measured in the circumferential direction.

In addition, it is preferable that the total sum of those lengths of all the above mentioned edge lines 811, 812, 813, 814, 815 of the all the above described shoulder side grooves 711, 712, 713, 714, 715 which are projected onto the plane 28 perpendicular to both the radial plane 27 containing the rotational axis of the tire and the tire equatorial plane, for example, 821a+821b+821c+821d+821e with respect to 811 shown in FIG. 4h is made at least larger, preferably at least 1.5 times larger than the total sum of the above lengths projected onto the radial plane 27 containing the rotational axis of the tire, for example, 831a+831b with respect to 811 shown in FIG. 4h. This is because of the fact that the use of such measure ensures a further increase of the total sum of those lengths of the above described edge lines existing in the ground contact surface when the tire runs along the circular course which are projected onto the tire equatorial line.

Moreover, it is preferable to provide the above described shoulder side groove 71 in at least half, preferably all the lands. The use of such measure ensures an increase of the total sum of those lengths of the above mentioned edge lines existing in the ground contact surface of the tire when it runs along the circular course which are projected onto the tire equatorial line and provides the important advantage that the change of the above mentioned sum due to the rotation of the tire becomes decreased and that the anti-transverse skid property can be improved and becomes uniform.

Concerning at least half, preferably all the lands provided with the shoulder side grooves, it is preferable that that portion 812g (FIG. 4h) or those portions 814g, 815g (FIG. 5g) of all the edge lines 811, 812 (FIG. 4h) or 811, 812, 813, 814, 815 (FIG. 5g) which are located in the same land and the nearest to the bead portion is or are located between a tire sidewall outer surface point 78 distant apart from a crossing point 74 between the arc 26 passing through the groove base 64 of the crown portion groove depth measuring position 63 and having a radius of curvature 25 which has a center on the tire width center line 22 on the radial plane containing the rotational axis of the tire and which is 1.55 times larger than the maximum tire sectional width 24 and the tire sidewall outer surface 31 by a distance 77 along the tire sidewall outer surface 31 toward the bead portion 1 which is 0.0123 times smaller than the tire sectional height 21 on the one hand and a tire sidewall outer surface point 76 spaced apart from the above mentioned crossing point 74 by a distance 75 along the tire sidewall outer surface 31 which is 0.0483 times smaller than the tire sectional height 21. Concerning at least half, preferably all the lands provided with the shoulder side grooves, it is also preferable that the total sum of those lengths of all the edge lines 811, 812 (FIG. 4) or 811, 812, 813, 814, 815 (FIG. 5) which are located nearer to the bead portion than a tire sidewall outer surface point 80 spaced apart from the shoulder 4 or 4" on the radial plane containing the rotational axis of the tire by a distance 79 which is 0.88 times smaller than the crown portion groove depth 65, for example, 814a, 814b, 814c, 815a, 815b, 815c in FIG. 5 and which are projected onto the plane 28 perpendicular to both the radial plane 27 containing the rotational axis of the tire and the tire equatorial plane, for example, $824a + 824b + 824c + 825a + 825b + 825c$ is made at least 0.5 times, preferably at least 0.67 times the average width 99 of the land in the above described portions and measured in the circumferential direction thereof. This is because of the fact that the use of such measure ensures a further increase of the total sum of those lengths of the above described edge lines which are projected onto the tire equatorial line and which exist in the ground contact surface when the tire runs along the circular course at the end of the wear of the tire and provides the important advantage that the anti-transverse skid property of the tire is further improved. In addition, it is preferable that the plane configuration of the shoulder side groove 71 is made substantially symmetrical with respect to the center 100 of the lug. This is because of the fact that the use of such measure ensures a uniform anti-transverse skid property even when the tire mounted position is changed and hence the direction of rotation of the tire changes.

Moreover, it is preferable to make the shoulder side groove 71 the same in its configuration and dimension in all the lands provided with the shoulder side groove 71 when the pattern is of monopitch and to make the shoulder side groove 71 similar in its overall configuration and the same in its radial direction dimension and sectional dimension in all the lands provided with the shoulder side groove 71 when the pattern is of variable pitch.

This is because of the fact that the use of such measure ensures a more uniform anti-transverse skid property of the tire.

Next, in order to effectively improve the water drainage property of the tire in the tire sidewall 3a near the shoulder, it is preferable that the total sum of those lengths of all the edge lines 811, 813, 814, 815 of the shoulder side grooves at least one portion of at least one end of which communicates with the depression 32, for example, 711, 713, 714, 715 shown in FIG. 5, which are projected onto the plane 28 perpendicular to both the radial plane 27 containing the rotational axis of the tire and the tire equatorial plane, that is, $821a + 821b + 823a + 823b + 824a + 824b + 824c + 825a + 825b + 825c$ is made at least 0.67 times the total sum of those lengths of all the edge lines 811, 812, 813, 814, 815 of all the shoulder side grooves, for example, 711, 712, 713, 714, 715 shown in FIG. 5, which are projected onto the plane 28 perpendicular to both the radial plane 27 containing the rotational axis of the tire and the tire equatorial plane, that is, $821a + 821b + 822a + 822b + 822c + 823a + 823b + 824a + 824b + 824c + 825a + 825b + 825c$.

Furthermore, in order to further improve the water drainage property of the tire, it is preferable to communicate at least one portion of at least one end of all the shoulder side grooves 71 with the depression 32 or to communicate at least one end of all the shoulder side grooves 71 with the depression 32 or the communicate both ends of the shoulder side groove 71 with the depression 32.

Besides, it is preferable that the groove width 101 (1011, 1012, ... ) of the shoulder side groove 71 is made at least 0.0070 times, preferably at least 0.0110 times the tire sectional height 21.

Furthermore, if one end only of the shoulder side groove 71 is in communication with the depression 32, as in the case of 711, 713, 714, 715 shown in FIG. 5, for example, it is preferable that the width of the shoulder side groove is made substantially the same or substantially enlarge from those ends 611e, 713e, 714e, 715e of the shoulder side groove 71 which are remained in the land to those ends 711d, 713d, 714d, 715d thereof which are in communication with the depression 32 or if both ends of the shoulder side groove 71 are in communication with the depressions 32, 32, as in the case of 711, 712 shown in FIG. 4, for example, it is preferable that the width of the shoulder side groove is made substantially the same or substantially enlarged from those positions 711f or 712f of the shoulder side groove 71 which are located near the center portion thereof toward the both ends 711d, 711e or 712d, 712e thereof.

In addition, if one end only of the shoulder side groove 71 communicates with the depression 32 as in the case of 711, 713, 714, 715 shown in FIG. 5, it is preferable that the depth 91 of the shoulder side groove 71 is made substantially the same or substantially enlarged from those ends 711e, 713e, 714e, 715e of the shoulder side groove which remain in the land toward those ends 711d, 713d, 714d, 715d of the shoulder side groove which are in communication with the depression. If both ends of the shoulder side groove are in communication with the depression 32 as in the case of 711, 712 shown in FIG. 4, it is preferable that the depth 91 of the shoulder side groove 71 is made substantially the same or substantially enlarge from those position 711f or 712f of the shoulder side groove which are near the center portion thereof toward both ends 711d, 711e or 712d, 712e thereof.

Moreover, it is also preferable to provide an additional radial direction groove 105 in the land 36 as shown in FIGS. 19 to 22, the additional groove 105 extending in the radial direction and having a radial component which is larger than the circumferential component by an extent not degrading the durability of the tire. The reasons why the use of such measure is preferable are omitted since these reasons are obvious from the above description.

Besides, in order to effectively prevent the tire sidewall 3a near the shoulder from being locally concentrated with strain, it is preferable that the total sum of those lengths 821, 822 or 821, 822, 823, 824, 825 of all the edge lines 811, 812 or 811, 812, 813, 814, 815 of all the shoulder side grooves 711, 712 or 711, 712, 713, 714, 715 which are projected onto the plane 28 perpendicular to both the radial plane 27 containing the rotational axis of the tire and the tire equatorial plane is made smaller than 7.0 times, preferably 4.0 times the total sum of those lengths 831, 832 or 831, 832, 833, 834, 835 of all the above mentioned edge line which are projected onto the radial plane 27 containing the rotational axis of the tire. Furthermore, it is preferable that those lengths of all the edge lines 811, 812 or 811, 812, 813, 814, 815 of all the shoulder side grooves 711, 712 or 711, 712, 713, 714, 715 which are projected onto the plane 28 perpendicular to both the radial plane 27 containing the rotational axis of the tire and the tire equatorial plane, for example, 821a+821b+821c+821d+821e of 811 shown in FIG. 4 is made smaller than 7.0 times, preferably 4.0 times the total sum of those lengths which are projected onto the radial plane 27 containing the rotational axis of the tire, for example, 831a+831b of 811 of FIG. 4.

The reasons why use is made of the above mentioned measure are as follows. The inventors research work has demonstrated the result that in general the larger the circumferential component of the edge line the easier the local concentration of the strain near the groove base 71c (711c, 712c, . . .) of the groove 71 occurs, and that such local concentration of the strain is prevented.

In addition, it is preferable that the configuration of the groove base in the cross-sectional plane of the shoulder side groove 71 is made a flask-shape or the like configuration so as to make the radius of the arc connecting the groove wall in the groove sectional plane to the groove base.

Besides, it is preferable that the groove depth of those portions of the shoulder side groove 71 which have relatively large circumferential components, for example, 711f, 711g, 711h of 711 shown in FIG. 4 is made shallower than the groove depth of those portions of the shoulder side groove 71 which have relatively small circumferential components. The reasons why use is made of such measure are as follows. The shallower the groove depth, the smaller the local concentration of the strain near the groove base. As a result, the groove depth of those portions of the side shoulder groove 71 which have relatively large circumferential component and at which the local concentration of strain easily occurs is made relatively shallow, thereby making the strain near the groove base of the shoulder side grooves as a whole uniform.

Furthermore, it is preferable that one end of the shoulder side grooves 71 is in the land 36 without communicating it with the depression 32 and that both ends of the other shoulder side groove are remained in the land 36 without communicating them with the depression 32. This is because of the fact that the use of the measure that one end or both ends of the shoulder side grooves is or are in the land ensures a significant decrease of the local concentration of the strain that tends to occur near the groove base.

In addition, if the edge lines 81 (811, 812, . . .), 102 (1021, 1022, . . .) formed between all the groove walls 71a, 71b or the groove wall 71b near the bead portion of all shoulder side grooves or the groove at one portion thereof and the sidewall outer surface 31 are mainly composed of a combination of straight lines, it is preferable that all of portions where these straight lines cross with each other, for example, 812h, 812i, 812j, 812k, 1022h, 1022i, 1022j, 1022k of 712 shown in FIG. 4 are connected with each other through an arc having a minimum radius which is at least 0.0070 times the tire sectional height 21, and that those portions where the angle $\alpha(\alpha_1, \alpha_2, \alpha_3, \ldots)$ formed between these straight lines at the groove side is smaller than 180°, for example, 812h, 812k, 1022i, 1022j of 712 shown in FIG. 4 are connected with each other through an arc having a minimum radius which is at least 0.011 times the tire sectional height 21. Moreover, it is further preferable that the edge lines 81, 102 formed between all the groove walls 71a, 71b of all or a part of the shoulder side grooves and the sidewall outer surface are composed of a combination of arcs each having a minimum radius which is at least 0.0070 times the tire sectional height. This is because of the fact that the use of such measure ensures a considerable decrease of the local concentratio of the strain onto the groove walls.

Besides, in order to further improve the safety property of the tire, it is desirous not only to improve the anti-transverse skid property of the tire but also to prevent the anti-transverse skid property from suddenly changing due to advance of the wear of the crown portion. That is, it is desirous that substantially no change or slow change occurs on the level of the anti-transverse skid property of the tire irrespective of the advance of the wear of the crown portion. For this purpose, it is preferable that that part of all the edge lines 811, 812, or 811, 812, 813, 814, 815 formed between the shoulder side groove walls 711a, 712a or 711a, 712a, 713a, 714a, 715a of all the shoulder side grooves 711, 712, or 711, 712, 713, 714, 715 and the tire sidewall outer surface 34 which is the nearest to the shoulder, for example, 811h shown in FIG. 4 is located at a position which is nearer to the shoulder than a tire sidewall outer surface point 104 which is distant apart from the shoulder 4 or 4'' on the radial plane containing the rotational axis of the tire by a distance 103 which extends along the outer surface of the sidewall of te tire and which is 0.0483 times, preferably 0.0335 times the tire sectional height 21. Furthermore, it is preferable that, on at least half, preferably, total the lands provided with the shoulder side groove 71, that edge line of all edge lines 811, 812 or 811, 812, 813, 814, 815 which is the nearest to the shoulder, for example, 811h shown in FIG. 4 is located at a position which is nearer to the shoulder than a sidewall outer surface point 104 distance apart from the shoulder 4 or 4" on the radial plane containing the rotational axis of the tire by a distance 103 extending along the outer surface 31 of the sidewall of the tire and which is 0.0483 times, preferably, 0.0335 times the tire sectional height 21.

In addition, it is preferable that the total sum of those edge lengths 821, 822 or 821, 822, 823, 824, 825 of all the edge lines 811, 812, or 811, 812, 813, 814, 815 of all the shoulder side grooves 711, 712, or 711, 712, 713, 714, 715 which are projected onto the plane 28 perpendicular to both the radial plane 27 containing the rotational axis of the tire and the tire equatorial plane is made at most 7.0 times, preferably at most 4.0 times the total sum of those lengths 831, 832, or 831, 832, 833, 834, 835 of all the above mentioned edge lines which are projected onto the radial plane 27 containing the rotational axis of the tire. Moreover, the total sum of those lengths of each of all the edge lines 811, 812, or 811, 812, 813, 814, 815 which are projected onto the plane 28 perpendicular to both the radial plane 27 containing the rotational axis of the tire and the tire equatorial plane, for example, $821a + 821b + 821c + 821d + 821e$ of 811 shown in FIG. 4, is made at most 7.0 times, preferably, at most 4.0 times the total sum of those lengths of the above mentioned edge lines which are projected onto the radial plane 27 containing the rotational axis of the tire, for example, $831a + 831b$ of 811 shown in FIG. 4.

Besides, it is also preferable that those number of the shoulder side grooves which appear on the same radial plane containing the rotational axis of the tire is made plural number, preferably within a range between 2 and 3.

Furthermore, it is preferable that a distance 97 along the sidewall outer surface 31 extending from a crossing point 95 between the bead portion side groove wall 71b of all the shoulder side grooves on the radial plane containing the rotational axis of the tire and the sidewall outer surface 31 to a crossing point 96 between the other shoulder side groove wall 71a and the sidewall outer surface 31 is made at most 0.0372 times, preferably, at most 0.0290 times the tire sectional height 21. The use of such measure ensures a gradual change of the total sum of those lengths of the edge lines present in the ground contact surface of the tire when it runs along the curved course and when the wear of the crown portion is advanced which are projected onto the equatorial line of the tire.

In the present invention, a new tire is mounted on a standard rim for the size of such new tire and then a maximum internal pressure for the ply rating of the new tire is applied into the tire and the assembly is left as it is at room temperature for at least 24 hours and subsequently the dimensions on each part of the tire under its inflated condition are measured. In this case, the dimensions of each part of the tire are based on JIS Standards, TRA Standards, ETRTO Standards or the like standards in the order as above mentioned.

The maximum sectional width of the tire shall be understood to mean that width of the maximum width position of the carcass which excludes the decoration line and embossed letters or the like.

As stated hereinbefore, the invention is capable of significantly improving various kinds of abilities of the tire, particularly, the anti-transverse skid property without degrading the overall durability and low noise property of the tire or significantly improving the low noise property or overall durability without degrading the anti-transverse skid property of the tire.

That is, the invention has a number of advantages. First, the invention is capable of improving the anti-transverse skid property with the aid of suitable number of shoulder side grooves arranged at the most suitable position of the tire sidewall near the shoulder and having the most suitable configuration, so that no influence is exerted upon the low noise property or durability of the tire. Second, the invention requires no change to the crown portion, so that it is possible to significantly improve the low noise property and overall durability or significantly improve the anti-transverse skid property without degrading the overall durability and low noise property. Third, the use of depression located at the most suitable position on the tire sidewall near the shoulder and having the most suitable configuration and dimension ensures the most suitable rigidity at the shoulder portion, so that it is possible to effectively make the side groove contact with the ground, thereby improving the anti-transverse skid property of the tire the tire without degrading the durability thereof. Fourth, the shoulder side grooves have the most suitable configuration and dimensions and at least one end of the shoulder side grooves having the most suitable ratio of the total sum of those lengths of all edge lines formed between the shoulder side groove walls of all the grooves on the same land and the sidewall outer surface which are projected onto a plane perpendicular to both the radial plane containing the rotational axis of the tire and the tire equatorial plane to the total sum of those lengths of the same edge lines which are projected onto the radial plane containing the rotational axis of the tire is communicated with the depression. Hence it is possible to effectively improve the waver drainage property of the tire without degrading the durability of the tire, thereby effectively improving the anti-transverse skid property of the tire. Fifth, the shoulder side grooves have the most suitable configuration and dimensions and the distance from the shoulder to the edge line formed between the shoulder side groove wall which is the nearest to the shoulder and the sidewall outer surface as well as the distance from the edge line formed between all the bead portion side groove wall and the sidewall outer surface to the edge line formed between the shoulder side groove wall of the other groove adjacent to the above groove near the bead portion and the sidewall outer surface have the most suitable dimensions. It is therefore possible to give to the edge line portion the most suitable durability and resistance to wear without degrading the anti-transverse skid property, thereby making the anti-transverse skid property of the tire everlasting. Finally, the shoulder side grooves have the most suitable configuration and dimensions and those number of shoulder side grooves which appear on the same radial plane containing the rotational axis of the tire has the most suitable number and these shoulder side grooves are arranged at the most suitable position, so that it is possible to make the change of those lengths of the edge lines formed between the shoulder side groove wall of the shoulder side groove and the sidewall outer surface which are projected onto the equatorial line of the tire and which can effectively prevent the anti-transverse skid produced on the ground contact surface when the tire runs along the curved course smaller even when the wear of the crown portion becomes advanced, and as a result, it is possible to prevent the anti-transverse skid property of the tire from changing due to the wear of the crown portion, thereby further improving the safety property of the tire.

In carrying out the invention into effect, the pattern provided on the crown portion may be combined with a lug pattern, rib pattern, rib-lug pattern, block pattern or any other patterns.

The edge line formed between the groove wall near the shoulder of the shoulder side groove and the sidewall outer surface may be of substantially line, but is not always required to be of strictly line. Use may be made of a slightly round edge line or an edge line having round corners. In this case, the position of the edge line is defined by a position where extended planes of these modified edge lines cross with each other. The same may be applied to any other edge lines.

In addition, the plane configuration of the shoulder side groove is not always required to be symmetrical with respect to the center of the lug, but may be asymmetrical with respect thereto. Moreover, the shoulder side grooves of all the lugs are not always required to have the same or similar configuration and dimensions.

The depression is not always required to be symmetrical with respect to the center line thereof. Furthermore, all the depressions are not always required to have the same or similar configuration and dimensions.

What is claimed is:

1. In a pneumatic tire having an anti-transverse skid property for vehicles which run at a high speed under a heavy load, comprising a pair of bead portions, a toroidal-shaped carcass extending across said bead portions, a tread rubber superimposed about said carcass, a tire sidewall connected through two side ends of said tread rubber, that is, shoulders to said tread, and depressions provided in said tire sidewall and for circumferentially dividing said tire sidewall into a number of lands, the improvement which comprises a shoulder side groove provided in the lands of the tire sidewall and improving the anti-transverse skid property of the tire and in which said shoulder side groove has such a sectional configuration that its depth is 0.0070 to 0.0255 times the tire sectional height and that the groove wall near the shoulder is inclined at an angle of 75° to 120° with respect to the tire sidewall outer surface, said shoulder side groove has such an arrangement that the total sum of those lengths of a crossing line between the groove wall near the shoulder and the tire sidewall outer surface, that is, the edge lines of the shoulder side groove which are projected onto a plane perpendicular to both the radial plane containing the rotational axis of the tire and the tire equatorial plane for dividing said land into two halves is made larger than the total sum of those lengths of said edge line which are projected onto the radial plane containing the rotational axis of the tire, said shoulder side groove is located at a position distant apart from said shoulder toward the bead portion along the tire sidewall outer surface by a distance which is at least 0.0123 times the tire sectional height, that portion of said groove edge lines which is the nearest to the bead portion is located within a limited range which is distant apart from a crossing point between an arc having a radius of curvature which has a center on a tire width center line in the radial plane containing the rotational axis of the tire and which is 1.55 times larger than the tire maximum sectional width and passing through the groove base at a crown portion groove depth measuring position and the tire sidewall outer surface by a distance along the tire sidewall surface which is 0.0123 to 0.0483 times the tire sectional height whereby the anti-transverse skid property of the tire at its wear end is improved, and those portions of said groove edge lines which are located between a position which is distant apart from said shoulder toward said bead portion along the tire sidewall outer surface by a distance which is 0.80 times the crown portion groove depth and said limited range and which are the nearest to the bead portion are arranged such that the total sum of those lengths of said groove edge lines which are projected onto a plane perpendicular to both said radial plane containing the rotational axis of the tire and said tire equatorial plane is at least 1.1 times larger than the total sum of those lengths of said groove edge lines which are projected onto said radial plane containing the rotational axis of the tire whereby the anti-transverse skid property of the tire after the middle wear period is improved.

2. The pneumatic tire according to claim 1, wherein said depression is located between a tire sidewall outer surface point distant apart from the shoulder in at least radial plane containing the rotational axis of the tire toward the bead portion along the tire sidewall outer surface by a distance which is 0.0186 times the tire sectional height and a tire sidewall outer surface point distant apart from a crossing point between an arc having a radius of curvature which has a center on a tire width center line in the radial plane containing the rotational axis of the tire and which is 1.55 times larger than the tire maximum sectional width and passing through a groove base at a crown portion groove depth measuring position and the tire sidewall outer surface toward the bead portion along the tire sidewall outer surface by a distance which is 0.060 times the tire sectional height, has a width which is measured in the circumferential direction of the tire and is 0.42 to 1.25 times the land with measured at the same point in the same direction along substantially total region of the depression, and has a depth which is at least 1.5 times larger than the shoulder side groove depth measured at the same point as the shoulder side groove.

3. The pneumatic tire according to claim 2, wherein said depression has a width which is circumferentially measured and which is 0.48 to 0.95 times the width of the land measured at the same point and in the same direction across substantially all regions of said depression.

4. The pneumatic tire according to claim 1, wherein said shoulder side groove wall in section is inclined at an angle of 85° to 110° with respect to the tire sidewall outer surface.

5. The pneumatic tire according to claim 1, wherein said shoulder side groove has a depth which is 0.0088 to 0.0155 times the tire sectional height.

6. The pneumatic tire according to claim 1, wherein said shoulder sidewall has a width which is at least 0.0070 times the tire sectional height.

7. The pneumatic tire according to claim 1, wherein an edge line formed between all the shoulder side groove walls and the tire sidewall outer surface is composed of a combination of arcs having a minimum radius which is at least 0.0070 times the tire sectional height.

8. The pneumatic tire according to claim 1, wherein the edge line formed between the shoulder side groove near the bead portion and the tire sidewall outer surface is mainly composed of a combination of straight lines and those straight lines which are inclined at an angle which is smaller than 180° are connected with each other through an arc having a minimum radius which is at least 0.011 times the tire sectional height.

9. The pneumatic tire according to claim 1, wherein that portion of all edge lines formed between the shoulder side groove wall and the tire sidewall outer surface which is the nearest to the shoulder is made nearer to the shoulder than a position distant apart from the shoulder on the radial plane containing the rotational axis of the tire by a distance which is 0.0483 times the tire sectional height along the tire sidewall outer surface.

10. The pneumatic tire according to claim 1, wherein a distance from a crossing point between that groove wall of the shoulder side groove which is near the bead portion in the radial plane containing the rotational axis of the tire and the tire sidewall outer surface to a crossing point between that groove wall of the other shoulder side groove adjacent to the bead portion which is near the shoulder and the tire sidewall outer surface is 0.0123 to 0.0372 times the tire sectional height.

11. The pneumatic tire according to claim 1, wherein the total sum of those lengths of said groove edge lines of the shoulder side grooves which are projected onto a plane perpendicular to both the radial plane containing the rotational axis of the tire and the tire equatorial plane is 1.5 to 4.0 times the total sum of those lengths of said edge lines of the shoulder side grooves which are projected onto the radial plane containing the rotational axis of the tire.

12. The pneumatic tire according to claim 1, wherein the total sum of those lengths located between a position distant apart from the shoulder on the radial plane containing the rotational axis of the tire along the tire sidewall outer surface to the bead portion by a distance which is 0.80 times the depth of the crown portion groove on the one hand and a position located within said limitation and nearest to the bead portion on the other hand which are projected onto a plane perpendicular to both the radial plane containing the rotational axis of the tire and the tire equatorial plane is at least 1.5 times larger than the total sum of those lengths of said groove edge lines which are projected onto the radial plane containing the rotational axis of the tire.

* * * * *